US008520692B2

(12) United States Patent
Li et al.

(10) Patent No.: US 8,520,692 B2
(45) Date of Patent: Aug. 27, 2013

(54) METHODS AND APPARATUS RELATED TO CONTROLLING TRAFFIC IN A WIRELESS COMMUNICATIONS SYSTEM USING SHARED AIR LINK TRAFFIC RESOURCES

(75) Inventors: Junyi Li, Bedminster, NJ (US); Rajiv Laroia, Far Hills, NJ (US); Thomas Richardson, South Orange, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 11/932,934

(22) Filed: Oct. 31, 2007

(65) Prior Publication Data

US 2009/0109850 A1 Apr. 30, 2009

(51) Int. Cl.
*H04L 12/28* (2006.01)
(52) U.S. Cl.
USPC .......................................................... 370/419
(58) Field of Classification Search
USPC .......................................................... 370/419
See application file for complete search history.

(56) References Cited

U.S. PATENT DOCUMENTS

| | | | | |
|---|---|---|---|---|
| 6,442,393 | B1 * | 8/2002 | Hogan | 455/456.5 |
| 6,590,885 | B1 * | 7/2003 | Jorgensen | 370/338 |
| 6,697,649 | B1 * | 2/2004 | Bennett et al. | 455/574 |
| 6,734,823 | B2 * | 5/2004 | Mintz et al. | 342/463 |
| 2005/0215284 | A1 * | 9/2005 | Su et al. | 455/556.2 |
| 2006/0050742 | A1 * | 3/2006 | Grandhi et al. | 370/506 |
| 2007/0105576 | A1 | 5/2007 | Gupta et al. | |

FOREIGN PATENT DOCUMENTS

| | | |
|---|---|---|
| CN | 1738310 A | 2/2006 |
| JP | 2006128871 A | 5/2006 |
| WO | WO2005076544 | 8/2005 |
| WO | WO2007051140 | 5/2007 |
| WO | WO 2007107895 A1 * | 9/2007 |

OTHER PUBLICATIONS

"A Simple Distributed PRMA for MANETs"—IEEE Mar. 2002, Jiang et al.*
Boggia G et al: "CF-MAC and H-MAC Protocols for Energy Saving in Wireless Ad Hoc Networks" Vehicular Technology Conference, 2005. VTC 2005-SPRING. 2005 IEEE 61 ST, IEEE, Piscataway, NJ, USA, vol. 4, May 30, 2005, pp. 2560-2564, XP010855900 ISBN: 978-0-7803-8887-1.

(Continued)

*Primary Examiner* — Ayaz Sheikh
*Assistant Examiner* — Hai-Chang Hsiung
(74) *Attorney, Agent, or Firm* — James K. O'Hare

(57) ABSTRACT

A peer to peer communications system implements scheduling of traffic intervals in a distributed manner utilizing connection priority and interference information. A peer to peer timing structure includes a user scheduling interval, with ordered transmission request and response intervals, and an associated traffic interval. The priority associated with a request of an early interval is higher than the priority of a request of a later interval. A first device, connected to a second device, makes a decision as to whether or not to yield the traffic interval as a function of estimated interference that it will impose on higher priority connection receivers if it transmits during the traffic interval. The second device makes a decision as to whether or not to transmit a positive transmission request response signal as a function of a generated received signal quality value, based on received requests for its own and for higher priority connections.

40 Claims, 15 Drawing Sheets

(56) References Cited

OTHER PUBLICATIONS

International Search Report and Written Opinion—PCT/US2008/081987, International Search Authority—European Patent Office—Apr. 15, 2009.

Shengming Jiang et al: "A Simple Distributed PRMA for MANETs" IEEE Transactions on Vehicular Technology, IEEE Service Center, Piscataway, NJ, US, vol. 51, No. 2, Mar. 1, 2002, XPOI1080642 ISSN: 001 8-9545.
Taiwan Search Report—TW097142314—TIPO—Jan. 30, 2012.

* cited by examiner

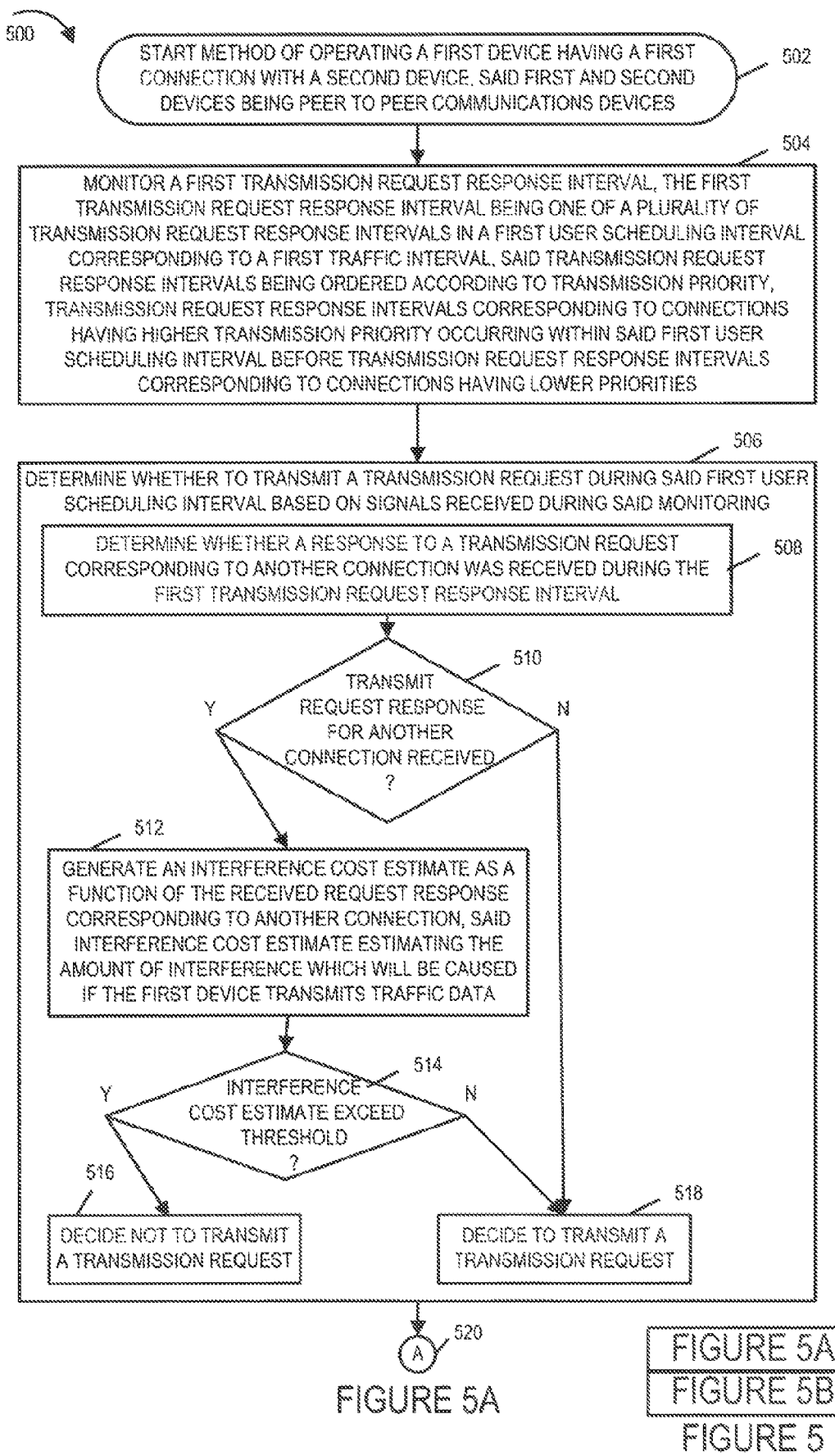

METHODS AND APPARATUS RELATED TO CONTROLLING TRAFFIC IN A WIRELESS COMMUNICATIONS SYSTEM USING SHARED AIR LINK TRAFFIC RESOURCES

FIELD

Various embodiments are directed to methods and apparatus for use in a wireless communications system and, more particularly, for use in a peer to peer wireless communications system.

BACKGROUND

In a peer to peer wireless communications systems multiple devices may desire to transmit traffic signals concurrently using the same air link resources. Scheduling users to an air link traffic resource in an efficient manner in a system lacking centralized control can be a challenging task. It would be beneficial if methods and apparatus were developed which take in account interference implications of transmission scheduling decisions. It would also be advantageous if methods and apparatus were developed which take in account priority considerations when making transmission scheduling decisions.

SUMMARY

Methods and apparatus for use in a wireless communications system in which traffic air link resources may be, and sometimes are, shared are described. Various described methods and apparatus are well suited for use in a peer to peer communications system in which transmission control decisions are made in a decentralized manner.

An exemplary peer to peer communications system implements the scheduling of traffic intervals in a distributed manner utilizing connection priority information and interference information. An exemplary peer to peer timing structure includes a user scheduling interval and an associated traffic interval. The user scheduling interval includes a plurality of ordered transmission request response intervals. The priority associated with a request response communicated in an early request response interval is higher than a request response communicated in a later request response interval of the user scheduling interval. An exemplary first peer to peer wireless communications device, having a connection with an exemplary second peer to peer wireless communications device, monitors for request response corresponding to its own connection and to higher priority connections. The first device makes a decision as to whether or not to yield the traffic interval as a function of estimated interference that it will impose on higher priority connection receivers if it transmits during the traffic interval.

An exemplary method, in accordance with various embodiments, of operating a first device having a first connection with a second device, said first and second devices being peer to peer communications devices comprises: monitoring a first transmission request response interval, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities; and determining whether to transmit a transmission request during said first user scheduling interval based on signals received during said monitoring. In some embodiments, the method further comprises: if it is determined that a transmission request should not be transmitted based on one of the received signals, refraining from using a transmission request interval corresponding to the first connection and refraining from transmitting traffic during said first traffic interval.

An exemplary first device, in accordance with various embodiments, having a first connection with a second device, said first and second devices being peer to peer communications devices, includes: a first monitoring module for monitoring a first transmission request response interval, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities; a transmission request determination module for determining whether to transmit a transmission request during said first user scheduling interval based on signals received during said monitoring; a transmission module for transmitting transmission requests; and a control module for controlling said transmission module to transmit a transmission request using a transmission request interval corresponding to the first connection when said determination module determines a transmission request is to be transmitted and for controlling the transmission module to refrain from transmitting using the transmission request interval corresponding to the first connection when it is determined that a transmission request should not be transmitted.

In various embodiments, the user scheduling interval includes a plurality of ordered transmission request intervals. The request priority of a request communicated in an early request interval is higher than a request communicated in a later request interval of the user scheduling interval. An exemplary second peer to peer wireless communications device, having a connection with an exemplary first peer to peer wireless communications device, monitors for requests corresponding to its own connection and to higher priority connections. The second device makes a decision as to whether or not to transmit a positive transmission request response signal to the first device as a function of a generated received signal quality value, e.g. an SNR or SIR value, based on received requests for its own connection and for higher priority connections.

An exemplary method of operating a second device having a first connection with a first device, said first and second devices being peer to peer communications devices, comprises: monitoring during a user scheduling interval for transmission requests corresponding to connections having a higher priority than said first connection and for a transmission request from said first device; storing signal information corresponding to transmission requests corresponding to higher priority connections detected by said monitoring; and if a transmission request from the first device is detected by said monitoring, determining whether to transmit a transmission request response based on a received signal quality value generated from the stored signal information.

An exemplary second device having a first connection with a first device, said first and second devices being peer to peer communications devices, includes: a monitoring module for monitoring to detect during a user scheduling interval transmission requests corresponding to connections having a higher priority than said first connection and for a transmission request from said first device; memory storing signal information corresponding to transmission requests corresponding to higher priority connections detected by said monitoring; and a transmission request response determination module for determining whether to transmit a transmission request response based on a received signal quality value generated from the stored signal information in response to a transmission request from the first device detected by said monitoring module.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 5 comprising the combination of FIG. 5A

DETAILED DESCRIPTION

Figure 1:
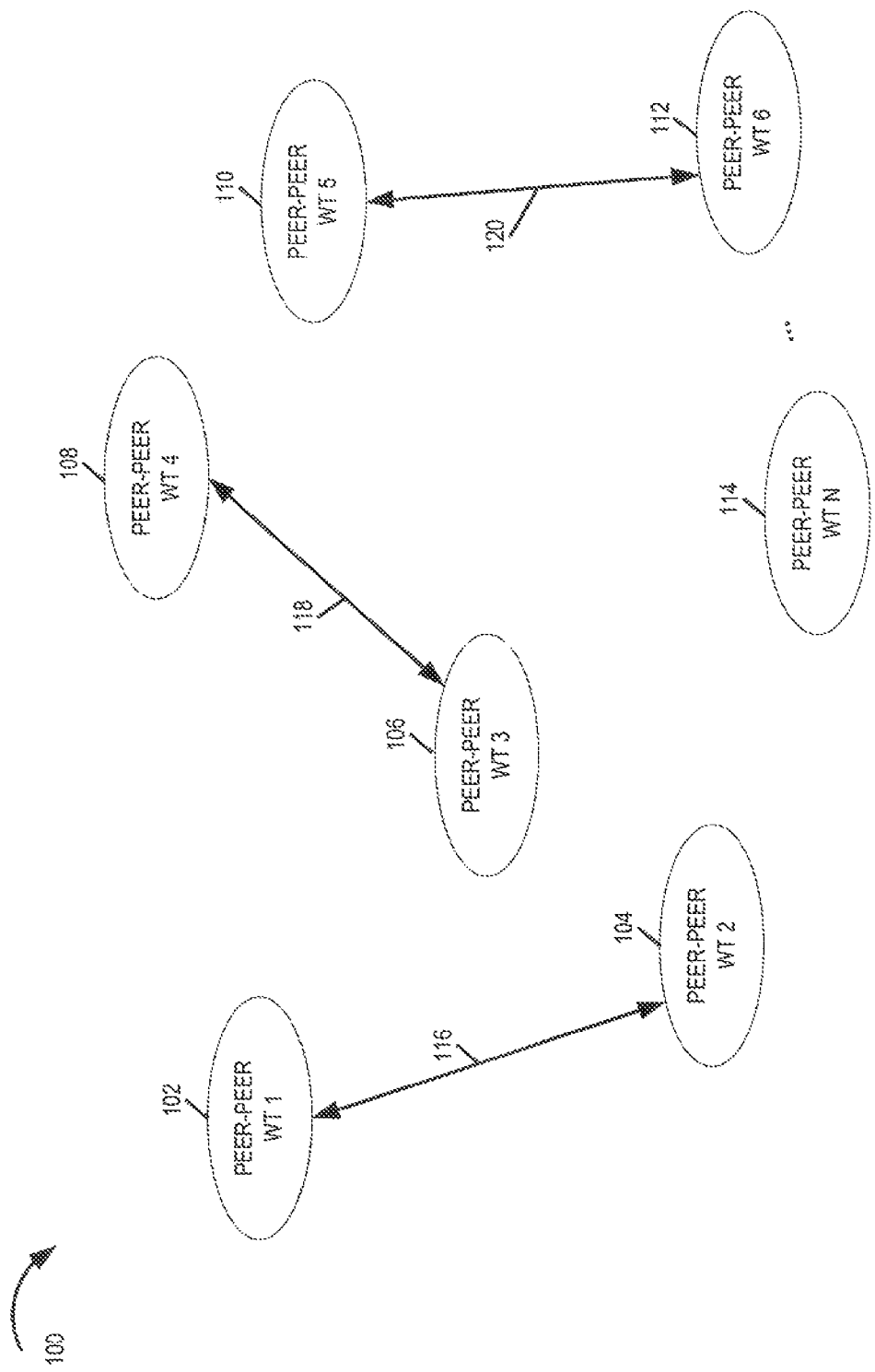
FIG. 1 is a drawing of an exemplary peer to peer wireless communications system in accordance with various embodiments.

FIG. 1 is a drawing of an exemplary peer to peer wireless communications system 100 in accordance with various embodiments. Exemplary wireless communications system 100 includes a plurality of wireless terminals, e.g., mobile nodes, supporting peer to peer communications (peer to peer wireless terminal 1 102, peer to peer wireless terminal 2 104, peer to peer wireless terminal 3 106, peer to peer wireless terminal 4 108, peer to peer wireless terminal 5 110, peer to peer wireless terminal 6 112, . . . , peer to peer wireless terminal N 114). In this example, at the time represented by FIG. 1, peer to peer wireless terminal 1 102 has an active connection with peer to peer wireless terminal 2 104 as indicated by arrow 116; peer to peer wireless terminal 3 106 has an active connection with peer to peer wireless terminal 4 108 as indicated by arrow 118; and peer to peer wireless terminal 5 110 has an active connection with peer to peer wireless terminal 6 112 as indicated by arrow 120.

In accordance with a feature of various embodiments, a decision whether or not to transmit on a peer to peer air link traffic resource, e.g., a peer to peer traffic segment, is performed in a distributed manner with both the transmission node and receiving node having an input into the decision process. In various embodiments, interference considerations regarding other peer to peer communications devices which may desire to transmit on the same peer to peer air link traffic resource are considered in making a transmission decision. In some such embodiments, monitored peer to peer signals from peer to peer devices with which a peer to peer device does not have an active connection are used in the transmission decision process.

In some embodiments, following a transmission request to transmit traffic signals, both the intended receiving device and the intended transmission device have an opportunity to yield to other peer to peer devices and refrain from allowing the requested peer to peer traffic signaling to proceed.

In some embodiments, following the transmission device's decision to transmit traffic and prior to transmission of said traffic, the transmission device transmits a peer to peer pilot signal. In some such embodiments, the peer to peer pilot signal is utilized by the receiving device to determine information, which is to be used to determine a data rate for the traffic data. In some embodiments, the air link resource conveying the traffic signals also conveys data rate information of the traffic.

In accordance with a feature of various embodiments, a user scheduling interval includes a plurality of transmission request intervals and at least some different transmission request intervals are associated with different priority levels. In some embodiments, a user scheduling interval includes a plurality of ordered transmission request intervals and a plurality of ordered transmission request response intervals. In some such embodiments, transmission request intervals and transmission request response intervals are interleaved within the user scheduling interval. In various embodiments, earlier position transmission request intervals have a higher priority than later transmission request intervals in the user scheduling interval.

Figure 2:
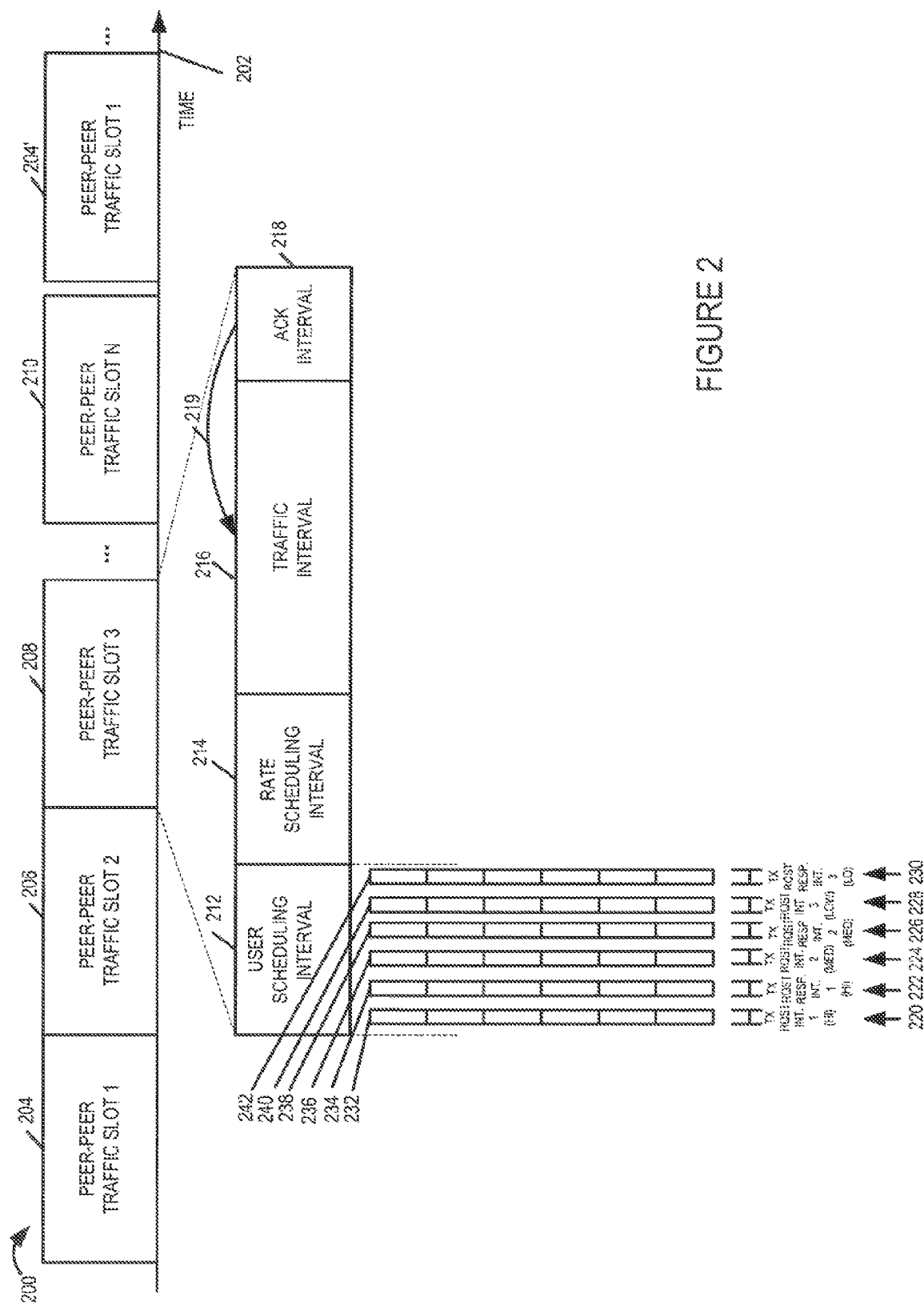
FIG. 2 is a drawing of exemplary peer to peer traffic slots in accordance with various embodiments.

FIG. 2 is a drawing 200 of exemplary peer to peer traffic slots in accordance with various embodiments. Drawing 200 illustrates an exemplary sequence of peer to peer traffic slots (peer to peer traffic slot 1 204, peer to peer traffic slot 2 206, peer to peer traffic slot 3 208, . . . , peer to peer traffic slot N 210) along time axis 202. In this exemplary embodiment, the sequence repeats as part of a recurring timing structure as indicated by peer to peer traffic slot 1 204' following peer to peer traffic slot N 210.

The exemplary drawing 200 is, e.g., a logical representation. In some embodiments, logical structure communications resources are mapped to physical air link resources. For example, peer-to-peer traffic slot 3 208 is shown to include user scheduling portion 212, rate scheduling portion 214, traffic portion 216, and acknowledgment portion 218, and those portions are adjacent to each other. The physical air link resources associated with those portions may have time gaps between them, e.g., to allow processing time. In some embodiments, tone hopping is implemented as part of the mapping.

Each exemplary peer to peer traffic slot, in some embodiments, includes a user scheduling interval, a rate scheduling interval, a traffic interval and an acknowledgement interval. In one exemplary embodiment, an exemplary peer to peer traffic slot, e.g., peer to peer traffic slot 3 208 includes user scheduling interval 212, rate scheduling interval 214, traffic interval 216 and acknowledgement interval 218. Acknowledgement interval 218 corresponds to traffic interval 216 as indicated by arrow 219.

The user scheduling interval 212 includes a plurality of transmission request intervals and a plurality of transmission request response intervals which are interleaved (transmission request interval 1 220, transmission request response interval 1 222, transmission request interval 2 224, transmission request response interval 2 226, transmission request interval 3 228, transmission request response interval 3 230). During the user scheduling interval 212 at least some symbols are designated for conveying traffic transmission request signals, e.g., a TX request signal, and at least some symbols are designated for conveying traffic transmission request response signals, e.g., an RX echo signal. Exemplary symbol 232, designated to be conveyed during TX request interval 1 220, is designated to carry transmission requests associated with a peer to peer connection having a high priority. Exemplary symbol 234, designated to be conveyed during transmission request response interval 1 222, is designated to carry transmission request responses associated with a peer to peer connection having a high priority. A request response conveyed in symbol 234 corresponds to a request communicated in symbol 232. Exemplary symbol 236, designated to be conveyed during TX request interval 2 224, is designated to carry transmission requests associated with a peer to peer connection having a medium priority. Exemplary symbol 238, designated to be conveyed during transmission request response interval 2 226, is designated to carry transmission request responses associated with a peer to peer connection having a medium priority. A request response conveyed in symbol 238 corresponds to a request communicated in symbol 236. Exemplary symbol 240, designated to be conveyed during TX request interval 3 228, is designated to carry transmission requests associated with a peer to peer connection having a low priority. Exemplary symbol 242, designated to be conveyed during transmission request response interval 3 230, is designated to carry transmission request responses associated with a peer to peer connection having a low priority. A request response conveyed in symbol 242 corresponds to a request communicated in symbol 240.

In some embodiments, a transmission request signal corresponding to a connection utilizes one tone for one symbol transmission time interval. In some embodiments, a transmission request response signal corresponding to a connection utilizes one tone for one symbol transmission time interval. In various embodiments, different positions for different connections during the same transmission request interval, e.g. TX request interval 2 224, are further associated with different priority level designations, e.g., different priority levels within the general designation of medium priority. In various embodiments, different positions for different connections during the same transmission request response interval, e.g. TX request response interval 2 226, are further associated with different priority level designations.

In some embodiments, there are different numbers of request intervals in the user scheduling interval 212, e.g. two transmission request intervals or more than two transmission request intervals. In some embodiments, there are different numbers of request response intervals in the user scheduling interval, e.g., two transmission request response intervals or more than two transmission request response intervals.

In some embodiments, the request intervals and request response intervals are not interleaved. For example, there is a first ordered set of three transmission request intervals followed by a second ordered set of three transmission request response intervals.

Figure 3:
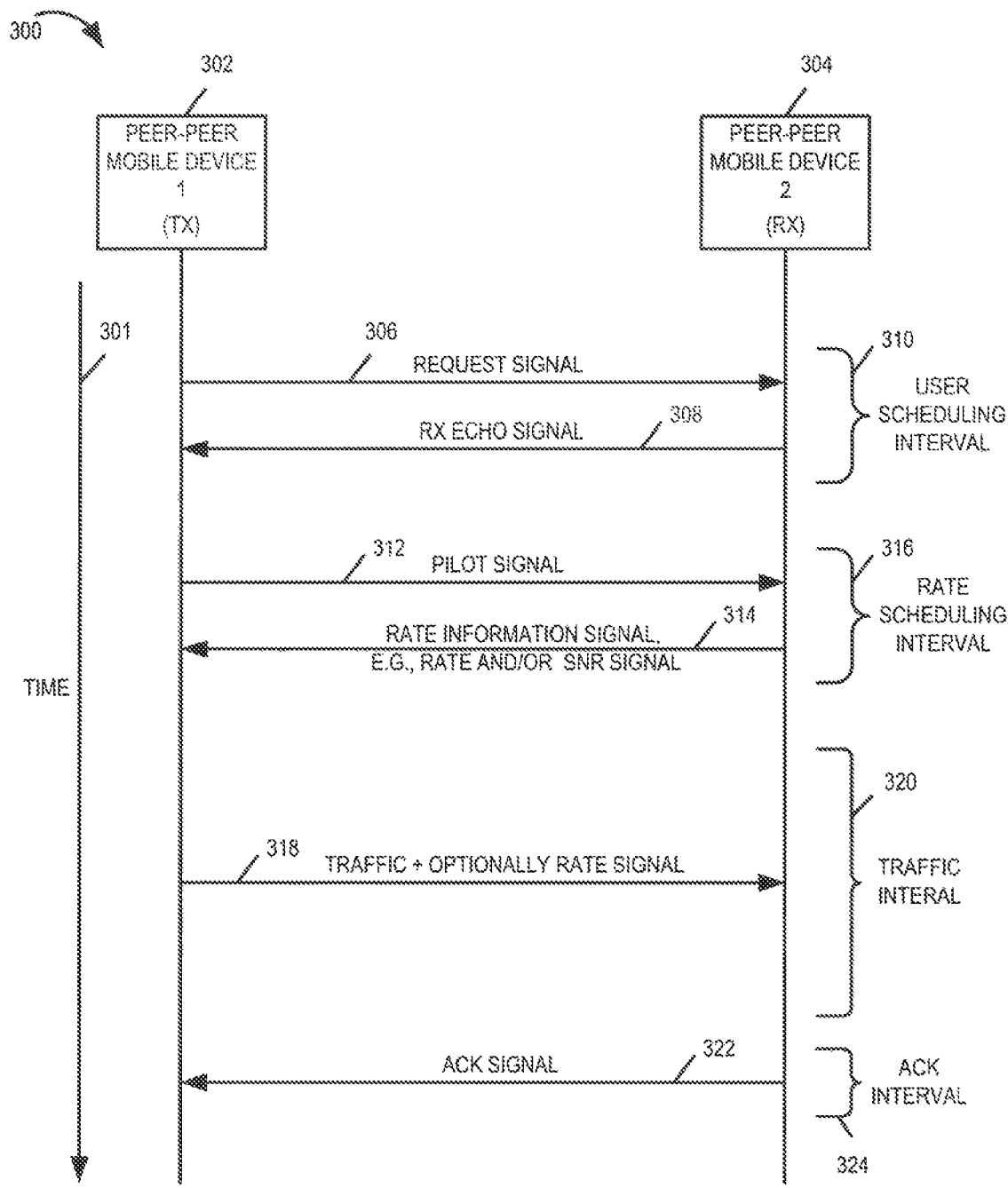
FIG. 3 is a drawing 300 illustrating peer to peer mobile communications devices and exemplary signaling exchanged between the devices to support peer to peer traffic in accordance with various embodiments, e.g., under the situation where the first device wants to send traffic in the slot to the second device and is allowed to proceed in accordance with priority considerations and interference considerations.

FIG. 3 is a drawing 300 illustrating peer to peer mobile communications devices (302, 304) and exemplary signaling exchanged between the devices (302, 304) to support peer to peer traffic in accordance with various embodiments, e.g., under the situation where the first device wants to send traffic in the slot to the second device and is allowed to proceed in accordance with priority considerations and interference considerations. Additional signals from other peer to peer devices in the local vicinity may be, and sometimes are, considered and utilized. The communications devices (302, 304) may be any of the peer to peer wireless terminals of FIG. 1. In this example, peer to peer mobile device 1 302 desires to transmit traffic signals to peer to peer mobile device 2 304. Line 301 indicates time; and there is a user scheduling interval 310, followed by a rate scheduling interval 316, followed by a traffic interval 320, followed by an acknowledgment interval 324. Intervals (310, 316, 320, 324) of FIG. 3 are, e.g., intervals (212, 214, 216, 218) of FIG. 2.

During the user scheduling interval 310, peer to peer mobile device 1 302 generates and transmits transmission request signal 306. Peer to peer mobile device 2 304, the intended recipient of transmission request signal 306 receives transmission request signal 306, processes the signal, considers the request, and sends a transmission request response signal, otherwise known as an RX echo signal 308, if it approves of the request. If it does not approve the request, the peer to peer mobile device 2 304 does not send a response.

During rate scheduling interval 316, the peer to peer mobile communications device 1 302 sends pilot signal 312. Peer to peer mobile device 2 304 receives the pilot signal 312, measures the received signal strength, and generates a rate information signal 314. The rate information signal 314 communicates, e.g., a rate, an SNR value, an interference value, and/or an SIR value, so that peer to peer mobile device 1 302 can determine a maximum allowable data rate to be used during subsequent traffic interval 320. Peer to peer mobile device 2 304 transmits the generated rate information signal 314 to peer to peer mobile device 1 302.

Peer to peer mobile device 1 302 receives the rate information signal 314 and determines a maximum allowed transmission rate to be used for traffic portion 320. Peer to peer mobile device 1 302 determines an actual data rate to use as a function of the determined maximum allowed transmission rate, wherein the actual data rate is less than or equal to the maximum allowed transmission rate. In various embodiments, the peer to peer mobile device 1 302 also considers (i) the amount of traffic data waiting to be communicated and/or (ii) its power status, e.g., remaining battery power and/or mode of operation, in determining the actual transmission data rate to use for the traffic.

Peer to peer mobile device 1 302 generates and transmits traffic signals 318 during traffic interval 320. The traffic signals communicate data at the determined actual data rate. In some embodiments, the traffic signals also carry an indication of the actual data rate. In one such embodiment, the rate information is communicated using a subset of the resources allocated for the traffic, e.g., the traffic resource includes a first portion, e.g., a first set of OFDM tone symbols, allocated to carry rate information, and a second portion, e.g., a second set of OFDM tone symbols, allocated to carry the traffic, e.g., user data, wherein the first and second sets are non-overlapping. In another such embodiment, the rate information is communicated using the same resources carrying traffic, e.g., the rate information is communicated via varying the transmit power of modulation symbols carrying traffic signals, e.g., some OFDM tone-symbols carrying the traffic are scaled at a first power level and others are scaled at a second power level, and the rate information is communicated by which positions are scaled at which levels.

Peer to peer mobile device 2 304 receives traffic signals 318 during traffic interval 320 and recovers the data being communicated. In some embodiments, rate information is also communicated with the traffic data. In some such embodiments, peer to peer mobile device 2 304 recovers the communicated rate information being communicated, and then decodes the traffic data signals. The peer to peer mobile device 2 304 determines whether or not the communicated data of the traffic signals 318 has been successfully recovered and generates a positive or negative acknowledgement signal.

During acknowledgment interval 324, the peer to peer mobile device 2 304 transmits the generated ACK signal 322 to mobile peer to peer to peer device 1 302. Peer to peer mobile device 1 302 receives the ACK signal 322, and updates transmission queue information based on the information conveyed by ACK signal 322.

Note that if peer to peer mobile device 1 302 does not receive an RX echo signal or subsequently decides not to proceed with transmission, the device 302 does not transmit pilot signal 312 and can terminate operation with regard to this traffic slot. Similarly, if peer to peer mobile device 304 decides not to proceed with transmission after it receives the request signal 306, the mobile device 304 does not transmit an RX echo signal and can terminate operation with regard to this traffic slot.

The process is repeated for additional traffic slots, e.g., as a function of traffic transmission needs of peer to per mobile device 1 302.

Figure 4:
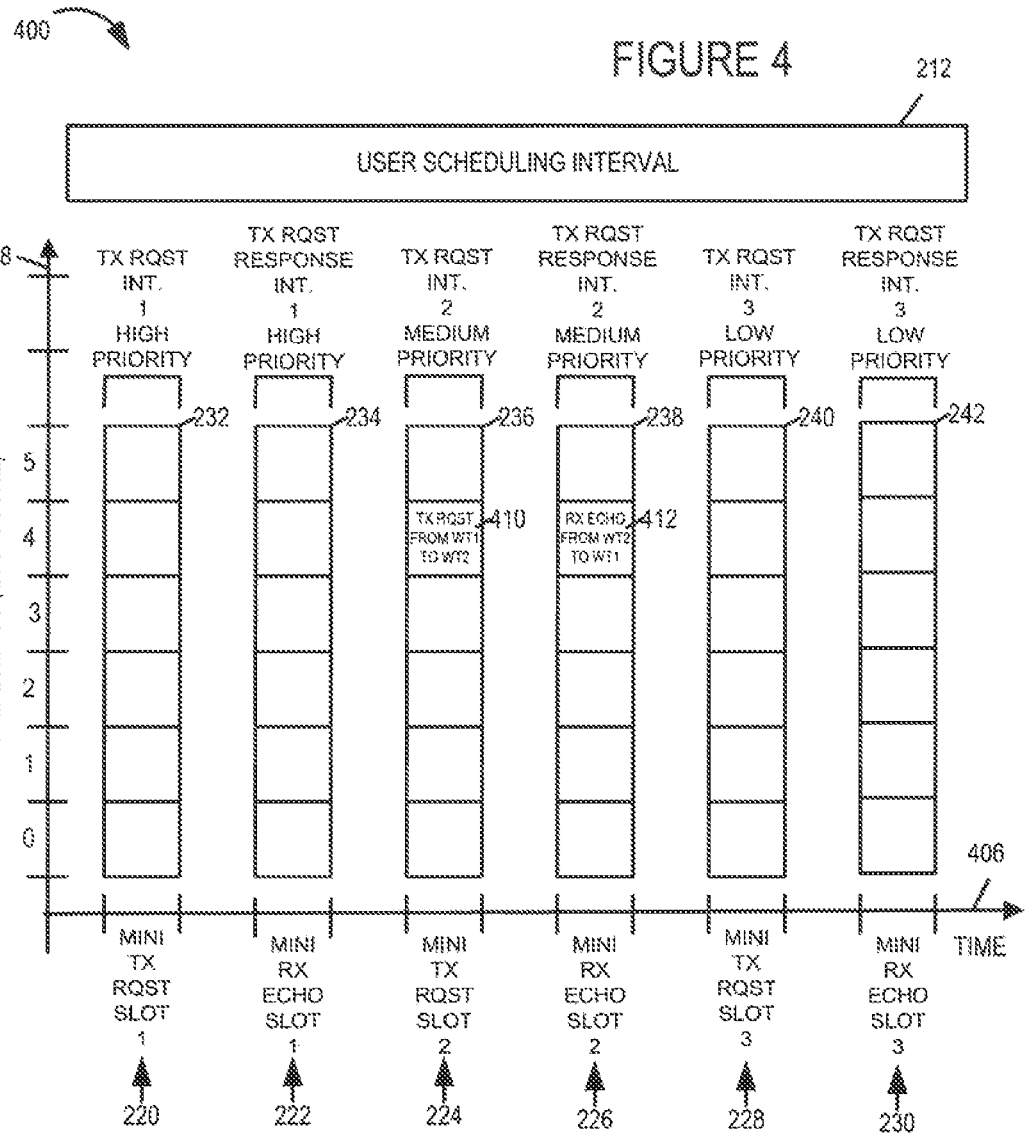
FIG. 4 is a drawing illustrating an exemplary user scheduling interval in a peer to peer recurring timing structure and an exemplary partition of air link resources of the user scheduling portion.

FIG. 4 is a drawing 400 illustrating an exemplary user scheduling interval 212 in a peer to peer recurring timing structure and an exemplary partition of air link resources of the user scheduling portion. The exemplary user scheduling interval 202 includes: (i) transmission request interval 1 220 associated with high priority, and otherwise referred to as mini TX request slot 1; (ii) transmission request response interval 1 222 associated with high priority, and otherwise referred to as mini RX echo slot 1; (iii) transmission request interval 2 224 associated with medium priority, and otherwise referred to as mini TX request slot 2; (iv) transmission request response interval 2 226 associated with medium priority, and otherwise referred to as mini RX echo slot 2; (v) transmission request interval 3 228 associated with low priority, and otherwise referred to as mini TX request slot 3; (iv) transmission request response interval 3 230 associated with low priority, and otherwise referred to as mini RX echo slot 3.

Intervals (220, 224, 228) are designated to carry transmission request signals (TX request signals) while intervals (222, 226, 230) are designated to carry transmission request response signals (RX echo signals).

Horizontal axis 406 represents time corresponding to blocks, while vertical axis 408 represents frequency, e.g., OFDM tones. OFDM symbol 232 carries transmission request signals for connections mapped into a position in the first transmission request interval 220. OFDM symbol 234 carries transmission request response signals for connections mapped into a position in the first transmission request response interval 222. OFDM symbol 236 carries transmission request signals for connections mapped into a position in the second transmission request interval 224. OFDM symbol 238 carries transmission request response signals for connections mapped into a position in the second transmission request response interval 226. OFDM symbol 240 carries transmission request signals for connections mapped into a position in the third transmission request interval 228. OFDM symbol 242 carries transmission request response signals for connections mapped into a position in the third transmission request response interval 230.

In this example, the position designated to carry a transmission request from WT 1 to WT 2 for transmission in traffic interval 216 of peer to peer traffic signals from wireless terminal 1 to wireless terminal 2 is designated as OFDM tone-symbol 410, which corresponds to tone with index number=4 in transmission request interval 2 224. In this example, the position designated to carry a transmission request response signal, e.g., an RX echo signal, from WT 2 to WT 1 is designated as OFDM tone-symbol 412, which corresponds to tone with index number=4 in transmission request response interval 2 226.

Wireless terminal 1, when it has traffic data that it would like to transmit to WT 2, when deciding whether or not to transmit a transmission request signal in tone-symbol 410 considers higher priority transmission request response signals corresponding to other connections which have been detected, e.g., request response signals detected during TX request response interval 1 222.

Wireless terminal 2, when it has received a transmission request signal from WT 1 data indicating that it would like to transmit to WT 2, when deciding whether or not to transmit a transmission request response signal in tone-symbol 412 considers higher priority transmission request signals corresponding to other connections which have been detected, e.g., request signals detected during TX request interval 1 220. In some embodiments, WT 2 also considers higher priority transmission request signals which have been communicated in transmission request interval 2 224.

Figure 5B:
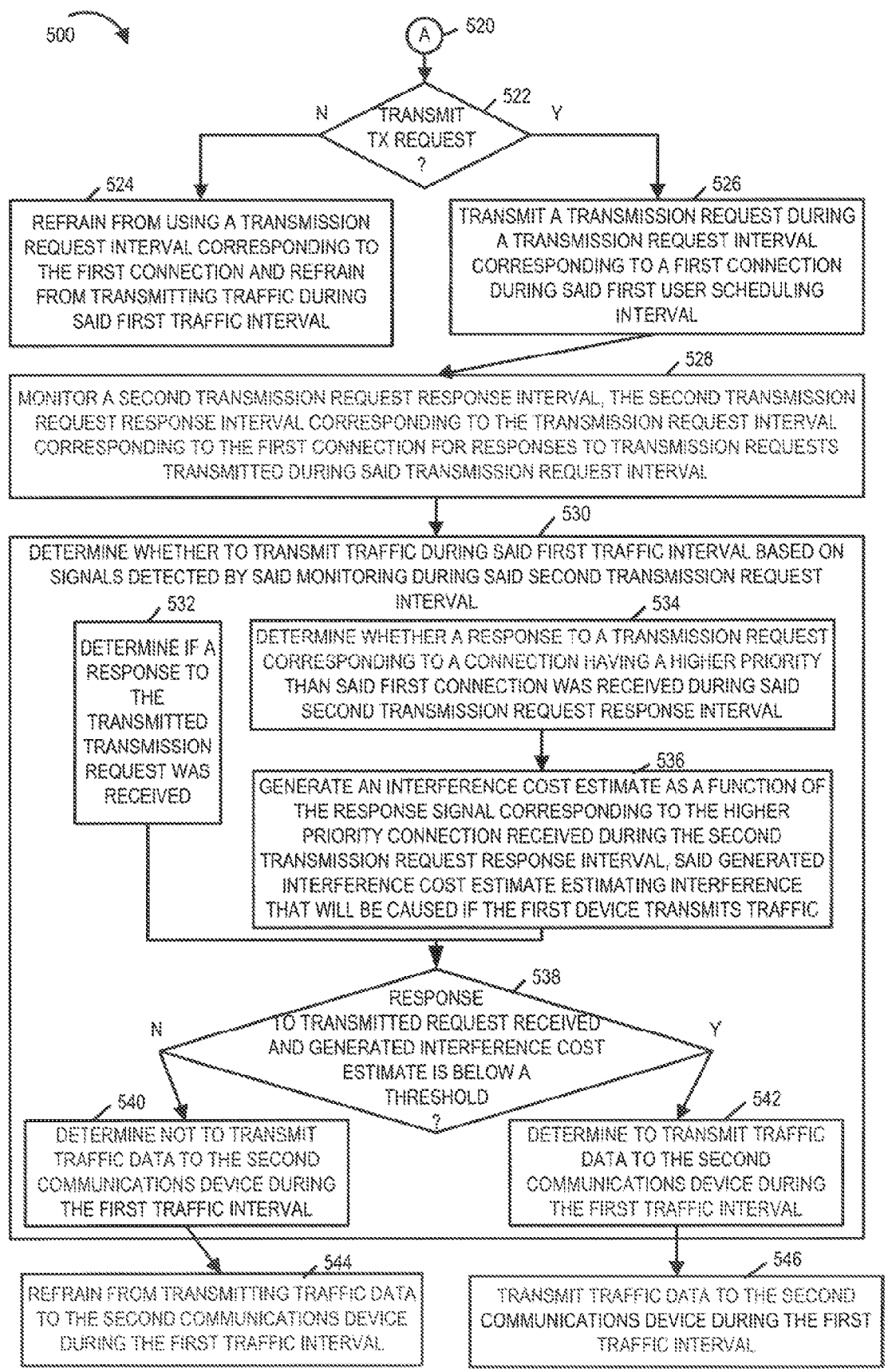
FIG. 5B is a flowchart of an exemplary method of operating a first device, having a connection with a second device, in accordance with various embodiments.

FIG. 5 comprising the combination of FIG. 5A and FIG. 5B is a flowchart 500 of an exemplary method of operating a first device, having a connection with a second device, in accordance with various embodiments. The first and second device are, e.g., wireless peer to peer communications devices. Operation of the exemplary method starts in step 502 and proceeds to step 504.

In step 504, the first device monitors a first transmission request response interval, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities. Operation proceeds from step 504 to step 506.

In step 506, the first device determines whether to transmit a transmission request during said first user scheduling interval based on signals received during said monitoring. Step 506 includes sub-steps 508, 510, 512, 514, 516 and 518.

In sub-step 508, the first device determines whether a response to a transmission request corresponding to another connection was received during the first transmission request response interval. Operation proceeds from sub-step 508 to sub-step 510. In sub-step 510, the first device proceeds depending upon the determination of sub-step 508. If a transmit request response for another connection was received, then operation proceeds from sub-step 510 to sub-step 512; otherwise operation proceeds from sub-step 510 to sub-step 518.

In sub-step 512, the first device generates an interference cost estimate as a function of the received request response corresponding to another connection, said interference cost estimate estimating the amount of interference which will be caused if the first device transmits traffic data. Operation proceeds from sub-step 512 to sub-step 514. In sub-step 514, the first device determines if the generated interference cost estimate exceeds a threshold. If the generated interference cost estimate exceeds the threshold, then operation proceeds from sub-step 514 to sub-step 516, in which the first device decides not to transmit a transmission request. Thus the first device yields the traffic air link resource allowing other devices to use the traffic air link resource without having to be subjected to interference from the first device. Alternatively, if in sub-step 514, the first device determines that the generated interference cost estimate does not exceed the threshold, then operation proceeds from sub-step 514 to sub-step 518. In sub-step 518, the first device decides to transmit a transmission request. Operation proceeds from step 506 to step 522 via connecting node A 520.

In step 522 the first device proceeds as a function of the determination of step 506. If the first device has decided not to transmit a transmission request, then operation proceeds from step 522 to step 524, in which the first device refrains from using a transmission request interval corresponding to the first connection and refrains from transmitting traffic during the first traffic interval. Alternatively, if the first device has decided to transmit a transmission request, then operation proceeds from step 522 to step 526 in which the first device transmits a transmission request during a transmission request interval corresponding to a first connection during said user scheduling interval. In various embodiments, the transmission request interval corresponding to the first connection follows a first transmission request interval corresponding to connections having a higher priority than said first connection and said first transmission request response interval. Operation proceeds from step 526 to step 528.

In step 528, the first device monitors a second transmission request response interval, the second transmission request response interval corresponding to the transmission request response interval corresponding to the first connection for responses to transmission requests transmitted during said transmission request interval. Operation proceeds from step 528 to step 530.

In step 530, the first device determines whether to transmit traffic during said first traffic interval based on signals detected by monitoring during said second transmission request interval. Step 530 includes sub-steps 533, 534, 536, 538, 540 and 542. In sub-step 532, the first device determines if a response to the transmitted transmission request of step 526 was received. Operation proceeds from sub-step 532 to sub-step 538. In sub-step 534, the first device determines whether a response to a transmission request corresponding to a connection having a higher priority than said first connection was received during said second transmission request response interval. Operation proceeds from sub-step 534 to sub-step 536. In sub-step 536, the first device generates an interference cost estimate as a function of the response signal corresponding to the higher priority connection received during the second transmission request response interval, said generated interference cost estimate estimating interference that will be caused if the first device transmits traffic. At some times, sub-step 534 may determine that a response to a transmission request corresponding to a connection having a higher priority connection was not received during the second transmission request interval, and in step 536 the interference cost estimate of sub-step 536 is set to null or a low predetermined value which is lower than the threshold value subsequently used in sub-step 538. Sub-steps 534 and 536 may be performed in parallel to sub-step 532 or in series with sub-step 532.

In sub-step 538 the first device proceeds as a function of the determination as to whether a response was received to the transmitted transmission request and the generated cost estimate. If a response to the transmitted request was received and the generated cost estimate is below a threshold, then operation proceeds from sub-step 538 to sub-step 542, where the first device determines to transmit traffic data to the second communications device during the first traffic interval. Operation proceeds from sub-step 542 to step 546, where the first device transmits traffic data to the second communications device during the first traffic interval.

However, if a response to the transmitted request was not received and/or the generated cost estimate is not below the threshold, then operation proceeds from sub-step 538 to sub-step 540, in which the first device determines not to transmit traffic data to the second communications device during the first traffic interval. Operation proceeds from sub-step 540 to step 544 in which the first device refrains from transmitting traffic data to the second communications device during the first traffic interval.

Figure 6:
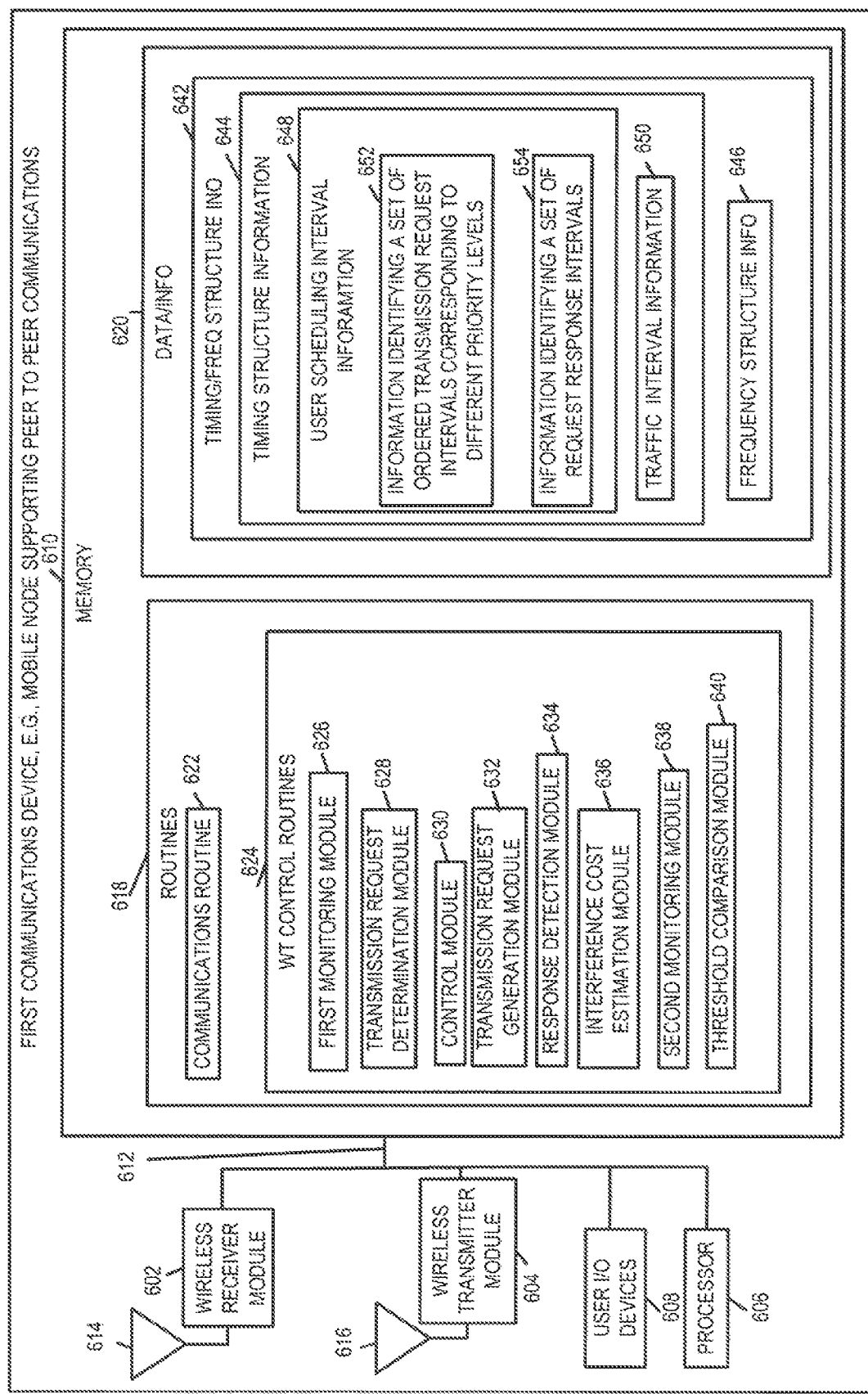
FIG. 6 is a drawing of an exemplary first communications device, e.g. a peer to peer communications device, in accordance with various embodiments.

FIG. 6 is a drawing of an exemplary first communications device 600 in accordance with various embodiments. Exemplary first communications device 600 is, e.g., a mobile node supporting peer to peer communications. At times, the first communications device 600 has a connection with a second communications device, e.g., a second mobile node supporting peer to peer communications.

First communications device 600 includes a wireless receiver module 602, a wireless transmitter module 604, user I/O devices 608, a processor 606, and a memory 610 coupled together via a bus 612 over which the various elements may interchange data and information. Memory 610 includes routines 618 and data/information 620.

Wireless receiver module 602, e.g., an OFDM receiver, is coupled to receive antenna 614 via which the first communications device receives signals from other peer to peer communications devices, e.g., a second communications device with which the first communications device has a connection and other peer to peer communications devices in the local vicinity.

Wireless transmitter module 604, e.g., an OFDM transmitter, is coupled to transmit antenna 616 via which the first communications device transmits peer to peer signals to other communications devices, e.g., to a second communications device with which the first communications device has a connection. In some embodiments, the same antenna is used for both transmitter and receiver. Wireless transmitter module 604 transmits transmission requests, e.g., a TX request to a second communications device with which the first device 600 has a connection, the transmission request being a request to transmit peer to peer traffic signals in a corresponding traffic interval.

User I/O devices 608 include, e.g., microphone, keypad, keyboard, mouse, camera, switches, speaker, display, etc. User I/O devices 608 allow a user of first communications device 600 to input data/information, access output data/information and control at least some functions of the communications device 600.

The processor 606, e.g., a CPU, executes the routines 618 and uses the data/information 620 in memory 610 to control the operation of the first communications device and implement methods, e.g., the method of flowchart 500 of FIG. 5.

Routines 618 include a communications routine 622 and wireless terminal control routines 624. The communications routine 622 implements the various communications protocols used by the first communications device 600. The wireless terminal control routines 624 include a first monitoring module 626, a transmission request determination module 628, a control module 630, a transmission request generation module 632, a response detection module 634, an interference cost estimation module 636, a second monitoring module 638 and a threshold comparison module 640.

Data/information 620 includes timing/frequency structure information 642. The timing frequency structure information includes timing structure information 644 and frequency structure information 646. The timing structure information 644 includes user scheduling interval information 648 and traffic interval information 650. The user scheduling interval information 648 includes information identifying a set of ordered transmission request intervals corresponding to different priority levels 652 and information identifying a set of request response intervals 654. For example, information 652 includes information identifying a first transmission request interval associated with a first priority level and a second transmission request interval associated with a second priority level, wherein the first priority level is higher than the second priority level and wherein the first transmission request interval occurs before the second transmission request interval. As an example, a first connection associated with a peer to peer connection from the first device 600 to a second device may be, and sometimes is, identified as being mapped to the second transmission request interval. Information identifying a set of request intervals 654, in some embodiments, identifies a first request response interval corresponding to the first transmission request interval and a second transmission request response interval corresponding to the second transmission request interval. In some such embodiments, the timing structure is such that the first transmission request interval is followed by the first transmission request response interval, which is followed by the second transmission request interval, which is followed by the second transmission request response interval. In some embodiments, the set of ordered transmission request intervals includes 3 or more ordered transmission request intervals.

Traffic interval information 650 identifies the traffic interval associated with the set of ordered transmission requests. For example, a TX request conveyed during a transmission request interval is a request to transmit peer to peer traffic signals during an associated traffic interval identified by traffic interval information 650, e.g., using a peer to peer traffic segment.

Frequency structure information 646 includes information identifying tones, e.g., OFDM tones utilized in the peer to peer timing/frequency structure. Frequency information 646 also identifies a particular tone associated with a particular peer to peer connection used to convey a transmission request and a particular tone associated with a particular peer to peer connection used to convey a request response signal, e.g., an RX echo signal. In various embodiments, priority of a transmission request is associated with the timing of the transmission request interval and the tone used to convey the transmission request signal. In various embodiments, priority of a transmission request response signal is associated with the timing of the transmission request response interval and the tone used to convey the transmission request response signal.

First monitoring module 626 monitors a first transmission request response interval, the first transmission request response interval being one of a plurality of transmission request response intervals in a first user scheduling interval corresponding to a first traffic interval, the transmission request response intervals being ordered according to transmission priority, transmission request response intervals corresponding to connections having higher transmission priority occurring within said first user scheduling interval before transmission request response intervals corresponding to connections having lower priorities.

Transmission request determination module 628 determines whether to transmit a transmission request during a first user scheduling interval based on signals received during the monitoring.

Control module 630 controls the wireless transmitter module 604 to transmit a transmission request using a transmission request interval corresponding to a first connection with a second communications device when the transmission request determination module 628 determines a transmission request is to be transmitted to the second communications device. Control module 630 also controls the wireless transmitter module 604 to refrain from using the transmission request interval corresponding to the first connection when the transmission request determination module 628 determines that a transmission request should not be transmitted.

Transmission request generation module 632 generates a transmission request when it is determined that a transmission request should be generated based on received signals. In some embodiments, the transmission request is a signal conveyed using the air link resources of one tone-symbol, e.g., one OFDM tone for the duration of one symbol transmission time interval. The control module 630 controls the wireless transmitter module 604 to transmit a generated transmission request during a transmission request interval corresponding to the first connection during the first user scheduling interval. In various embodiments, the transmission request interval corresponding to the first connection follows a first transmission request interval corresponding to connections having higher priority than said first connection and said first transmission request response interval.

Response detection module 634 detects whether a response to a transmission request corresponding to another connection was received during the first transmission request response interval. Interference cost estimation module 636 estimates an interference cost estimate as a function of the received response corresponding to said another connection. The interference cost estimate estimates interference which will be caused if the first device 600 transmits traffic data.

Second monitoring module 638 monitors a second transmission request response interval, the second transmission request response interval corresponding to the transmission request interval corresponding to the first connection for responses to transmission requests transmitted during the transmission request interval.

Threshold comparison module 640 compares a generated interference cost estimate from module 636 to a threshold, e.g., a stored predetermined threshold, used to determine if traffic data is to be transmitted.

Figure 7:
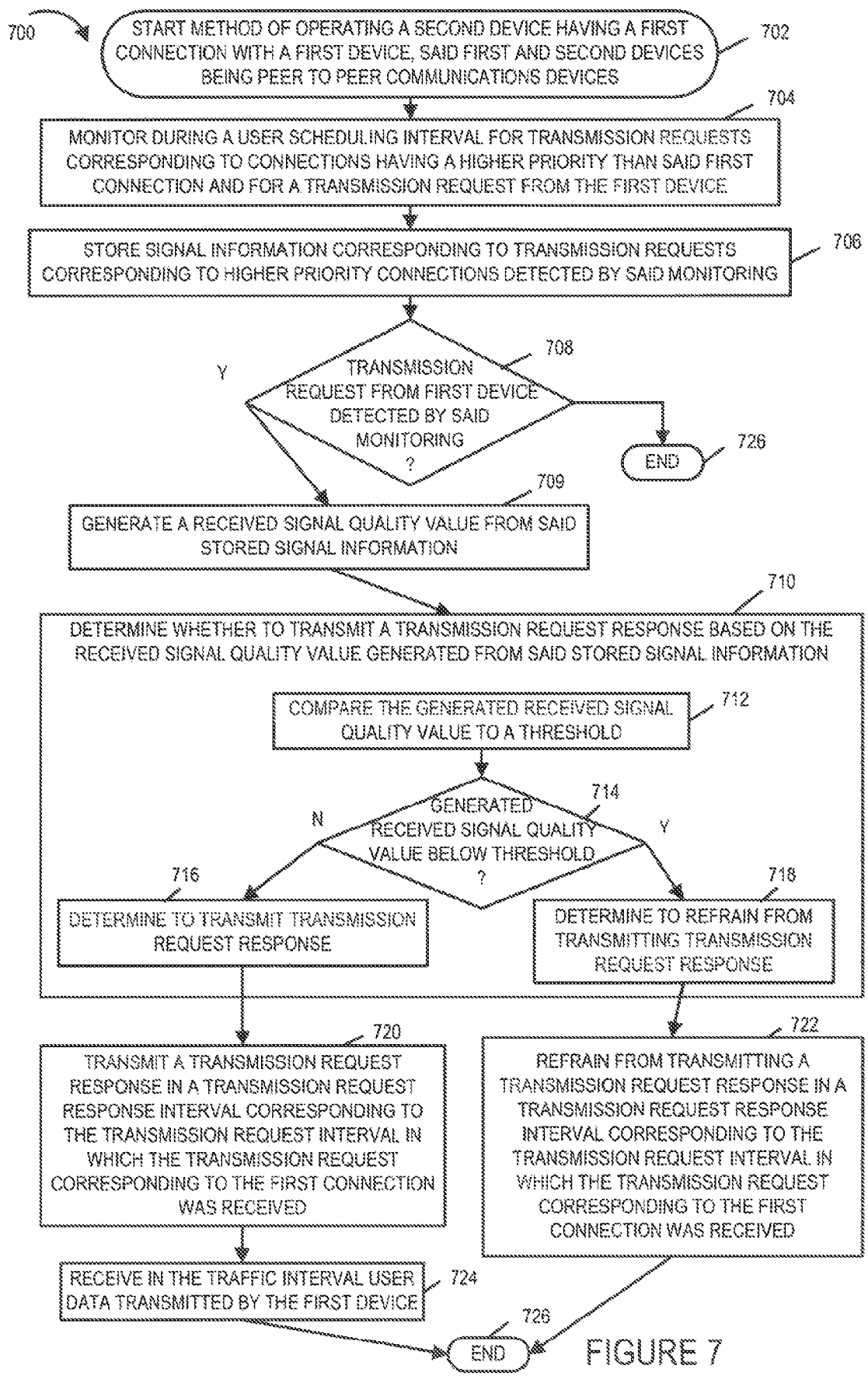
FIG. 7 is a flowchart of an exemplary method of operating a second device having a first connection with a first device in accordance with various embodiments.

FIG. 7 is a flowchart 700 of an exemplary method of operating a second device having a first connection with a first device in accordance with various embodiments. The second device and the first devices are, e.g., peer to peer wireless communications devices. Operation of the exemplary method starts in step 702 and proceeds to step 704.

In step 704, the second communications device monitors during a user scheduling interval for transmission requests corresponding to connections having a higher priority than said first connection and for transmission requests from the first device. In various embodiments, transmission requests are transmitted during transmission request intervals, and the user scheduling interval includes multiple transmission request intervals and corresponding transmission request response intervals. In some embodiments, the monitoring includes monitoring transmission request intervals including a transmission request interval during which a transmission request from the first device, with which the second device has a connection, may be transmitted and any preceding transmission request intervals in the user scheduling interval. In various embodiments, the transmission request intervals are ordered in the user scheduling interval according to transmission priority, transmission request intervals corresponding to connections having higher priority occurring within said user scheduling interval before transmission request intervals corresponding to connections having lower priorities. In some embodiments, the transmission request intervals are interleaved with corresponding transmission request response intervals during the user scheduling interval.

Operation proceeds from step 704 to step 706. In step 706, the second device stores signal information corresponding to transmission requests corresponding to higher priority connections detected by the monitoring. Operation proceeds from step 706 to step 708.

In step 708, the second device determines whether or not a transmission request from the first device was detected by the monitoring. If a transmission request from the first device was not detected by the monitoring, then operation proceeds from step 708 to end step 726, where operation stops with regard to this traffic slot. However, if a transmission request from the first device was detected by the monitoring, then operation proceeds from step 708 to step 709. In step 709, the first device generates a signal quality value from said stored signal information. In some embodiments, the first device generates a signal quality value from stored signal information corresponding to detected higher priority transmission requests and from information corresponding to a detected transmission request from the first device. In some embodiments, the generated signal quality value is one of a signal to noise ratio and a signal to interference ratio.

In step 710, the second device determines whether to transmit a transmission request response based on the received signal quality value generated from said stored signal information. Step 710 includes sub-steps 712, 714, 716 and 718. In sub-step 712, the second device compares the generated received signal quality value to a threshold. The threshold is, e.g., a receiver yielding (RX yielding) threshold which may be and sometimes is a predetermined value. Operation proceeds from sub-step 712 to sub-step 714. In sub-step 714, if the generated received signal quality value is below a threshold, then operation proceeds from sub-step 714 to sub-step 718; otherwise operation proceeds from sub-step 714 to sub-step 716.

In sub-step 716, the second device determines to transmit a transmission request response. Returning to sub-step 718, in sub-step 718 the second communications device determines to refrain from transmitting a transmission request response.

Operation proceeds from sub-step 716 to step 720. In step 720, the second communications device transmits a transmission request response in a transmission request response interval corresponding to the transmission request interval in which the transmission request corresponding to the first connection was received. Then, in step 724 the second communications device receives in the traffic interval user data transmitted by the first device. Operation proceeds from step 724 to end step 726, where operation stops with regard to this traffic slot.

Returning to sub-step 718, operation proceeds from sub-step 718 to step 722. In step 722 the second communications device is operated to refrain from transmitting a transmission request response in a transmission request response interval corresponding to the transmission request interval in which the transmission request corresponding to the first connection was received. Operation proceeds from step 722 to end step 726, where operation stops with regard to this traffic slot.

Figure 8:
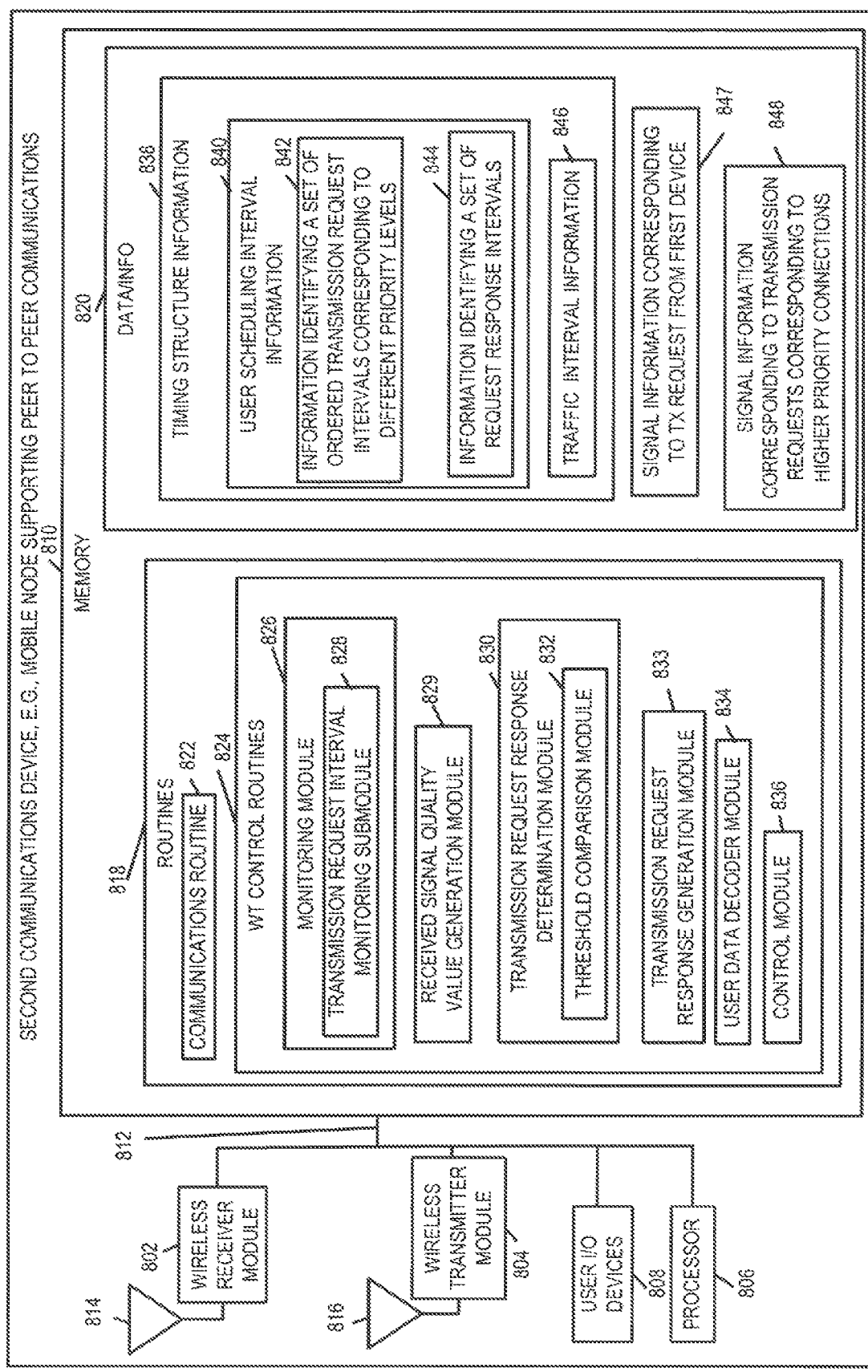
FIG. 8 is a drawing of an exemplary second communications device in accordance with various embodiments.

FIG. 8 is a drawing of an exemplary second communications device 800 in accordance with various embodiments. Exemplary second communications device 800 is, e.g., a wireless mobile node supporting peer to peer communications. The second communications device 800 has, at times, a connection with a first communications device, e.g., another wireless mobile node supporting peer to peer communications.

Exemplary second communications device 800 includes a wireless receiver module 802, a wireless transmitter module 804, user I/O device 808, a processor 806 and memory 810 coupled together via a bus 812 over which the various elements may interchange data and information. Memory 810 includes routines 818 and data/information 820.

Wireless receiver module 802, e.g., an OFDM receiver, is coupled to receive antenna 814 via which the second device 800 receives peer to peer signals from other communications devices, e.g., from a first communications device with which the second communications device 800 has a connection and from other peer to peer communications devices in the local vicinity. Wireless receiver module 802 receives transmission request signals during a user scheduling interval, e.g., a TX request from a first communications device with which the second communications device 800 has a connection. Wireless receiver module 802 also receives user data signals during a traffic interval, e.g., peer to peer user data signals during a traffic interval which were transmitted from a first communications device with which the second communications device has a connection.

Wireless transmitter module 804, e.g., an OFDM transmitter, is coupled to transmit antenna 816 via which the second communications device 800 transmits peer to peer signals to other peer to peer communications devices, e.g., to a first communications device with which the second communications device 800 has a connection. In some embodiments, the second communications device 800 uses the same antenna for both receiver and transmitter. Wireless transmitter module 804 transmits a transmission request response signal, e.g., an RX echo signal, in a transmission request response interval corresponding to a transmission request interval in which a transmission request corresponding to a first connection with a first communications device was received.

User I/O devices 808 include, e.g., microphone, keyboard, keypad, switches, mouse, camera, speaker, display, etc. User I/O devices 808 allow a user of second communications device 800 to input data/information, access output data/information, and control at least some functions of the second communications device 800, e.g., initiate a connection with another peer to peer communications device, input peer to peer user traffic data, etc.

Processor 806, e.g., a CPU, executes the routines 818 and uses the data/information 820 in memory 810 to control the operation of the second communications device 800 and implement methods, e.g., the method of flowchart 700 of FIG. 7. Routines 818 include a communications routine 822 and wireless terminal control routines 824. The communications routine 822 implements the various communications protocols used by the second communications device 800. The wireless terminal control routines 824 include a monitoring module 826, a received signal quality value generation module 829, a transmission request response determination module 830, a transmission request response generation module 833, a user data decoder module 834 and a control module 836. The monitoring module 826 includes a transmission request interval monitoring sub-module 828. The transmission request response determination module 830 includes a threshold comparison module 832.

Data/information 820 includes timing structure information 838, signal information corresponding to a detected transmission request from a first communication device with which the second device has a connection 847, and signal information corresponding to transmission requests corresponding to higher priority connections 848. The timing structure information 838 includes user scheduling interval information 840 and traffic interval information 846. The user scheduling interval information 840 includes information identifying a set of ordered transmission request intervals corresponding to different priority levels 842 and information identifying a set of request response intervals 844. In various embodiments, there is a corresponding request response interval for each transmission request interval. In some embodiments, the transmission request intervals are interleaved with the transmission request response intervals. In various embodiments, the timing structure information 838 identifies a set of ordered transmission request intervals corresponding to different priority levels wherein transmission request intervals corresponding to connections having higher transmission priority occur within the user scheduling interval before transmission request intervals corresponding to connections having lower priority. Traffic interval information 846 identifies a traffic interval, e.g., including a peer to peer traffic segment, to which requests communicated in the user scheduling interval correspond.

Signal information corresponding to a transmission request from the first device with which the second device has a connection 847 includes, e.g., power measurement information of the received transmission request from the first device. Signal information corresponding to transmission requests corresponding to higher priority connections 848 include information such as, e.g., received power level information corresponding to transmission requests corresponding to higher priority connections detected by the monitoring module.

Monitoring module 826 monitors to detect during a user scheduling interval transmission requests corresponding to connections having a higher priority than said first connection and for a transmission request from the first device.

In some embodiments, transmission requests are transmitted during transmission request intervals, and a user scheduling interval includes multiple transmission request intervals and corresponding transmission request response intervals. Transmission request interval monitoring sub-module 828 monitors transmission request intervals including a transmission request interval during which a transmission request from the first device may be transmitted and any preceding transmission request intervals in the user scheduling interval. In some embodiments, the transmission request intervals are interleaved with corresponding transmission request response intervals during the user scheduling interval.

Received signal quality value generation module 829 generates a received signal quality value as a function of a detected transmission request signal corresponding to a first device with which the second device 800 has a connection and signal information corresponding to transmission requests corresponding to higher priority connections 848. In some embodiments, the generated received signal quality value is one of a signal to noise value and a signal to interference value. In some embodiments, the generated received signal quality value is an estimate of expected signal to noise or expected signal to interference at the receiver 802 of second communications device 800 should the second communications device receive traffic signals from the first communications device during the traffic interval.

Transmission request response determination module 830 determines whether to transmit a transmission request response, e.g., an RX echo signal, based on a received signal value generated from stored signal information in response to a transmission request from the first device detected by the monitoring module 826. In some embodiments, the generated received signal quality value is one of a signal to noise ratio value and a signal to interference value.

Threshold comparison module 832 compares a generated received signal quality value to a threshold. The threshold is, e.g., a receiver yielding threshold which may be, and sometimes is, predetermined.

Transmission request response generation module 833 generates a transmission request response signal, e.g., an RX echo signal to be transmitted to a first communications device with which the second communications device has a connection and from which the second communications device received a transmission request. In some embodiments, the generated transmission request response signal is a signal which is communicated using a single tone-symbol, e.g., one OFDM tone for the duration of one symbol transmission time interval.

User data decoder module 834 decodes user data signals received by the wireless receiver module 802. Control module 836 controls the wireless transmitter module 804 to refrain from transmitting a transmission request response in a transmission request response interval corresponding to the transmission request interval in which the transmission request corresponding to the first connection was received when the determination module 830 determines that a transmission request response should not be transmitted in response to a detected transmission request corresponding to the first connection.

Figure 9:
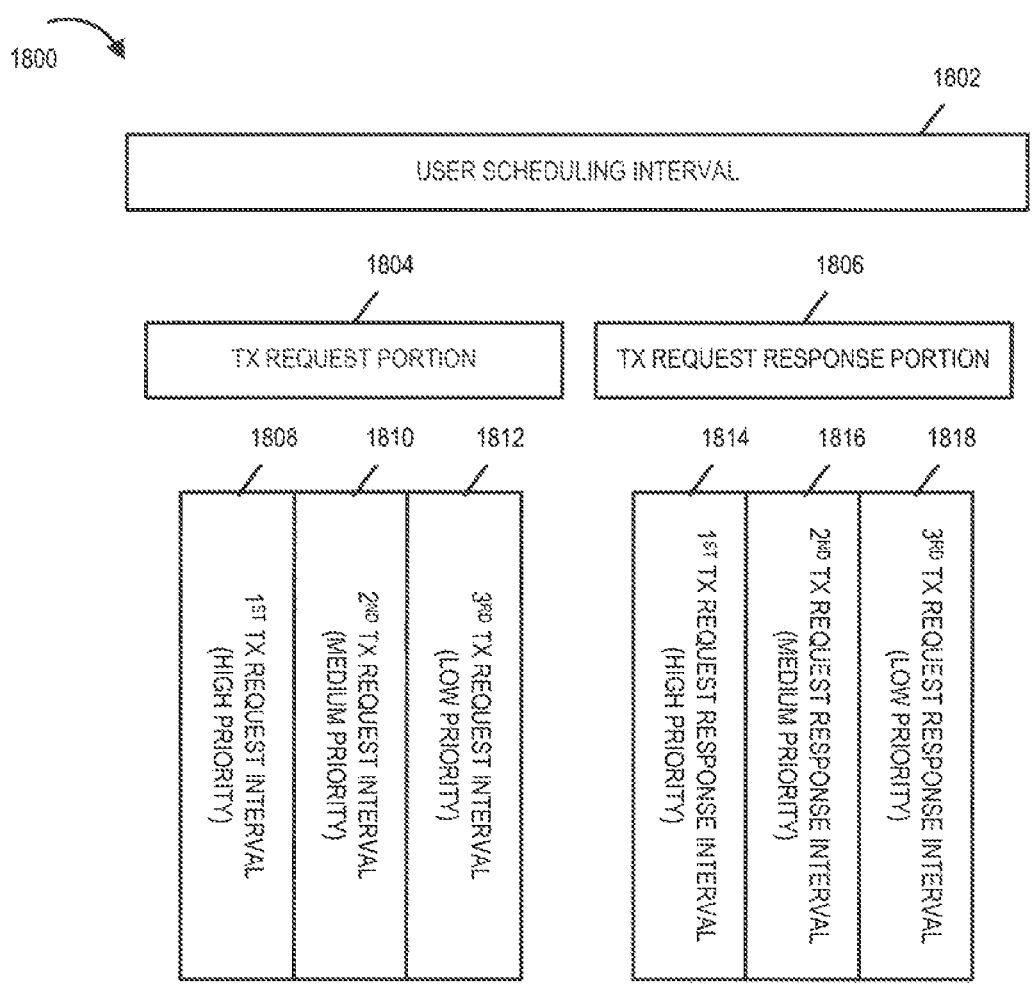
FIG. 9 is a drawing illustrating an alternative structure used in some embodiments, in which a plurality of ordered transmission request intervals precede a plurality of ordered transmission request response intervals.

FIG. 9 is a drawing 1800 illustrating an alternative structure used in some embodiments, in which a plurality of ordered transmission request intervals preceed a plurality of ordered transmission request response intervals. This alternative structure is used in some embodiments instead of the structure illustrated in FIG. 4 with interleaving between request and response intervals. Exemplary user scheduling portion 1802 includes a transmission request portion 1804 followed by transmission response portion 1806. Transmission request portion 1804 includes a $1^{st}$ transmission request interval 1808 associated with high priority connections, followed by a $2^{nd}$ transmission request interval 1810 associated with medium priority connections, followed by a $3^{rd}$ request interval 1812 associated with low priority connections. Transmission request response portion 1806 includes a $1^{st}$ transmission request response interval 1814 associated with high priority connections, followed by a $2^{nd}$ transmission request response interval 1816 associated with medium priority connections, followed by a $3^{rd}$ request response interval 1818 associated with low priority connections.

Figure 10:
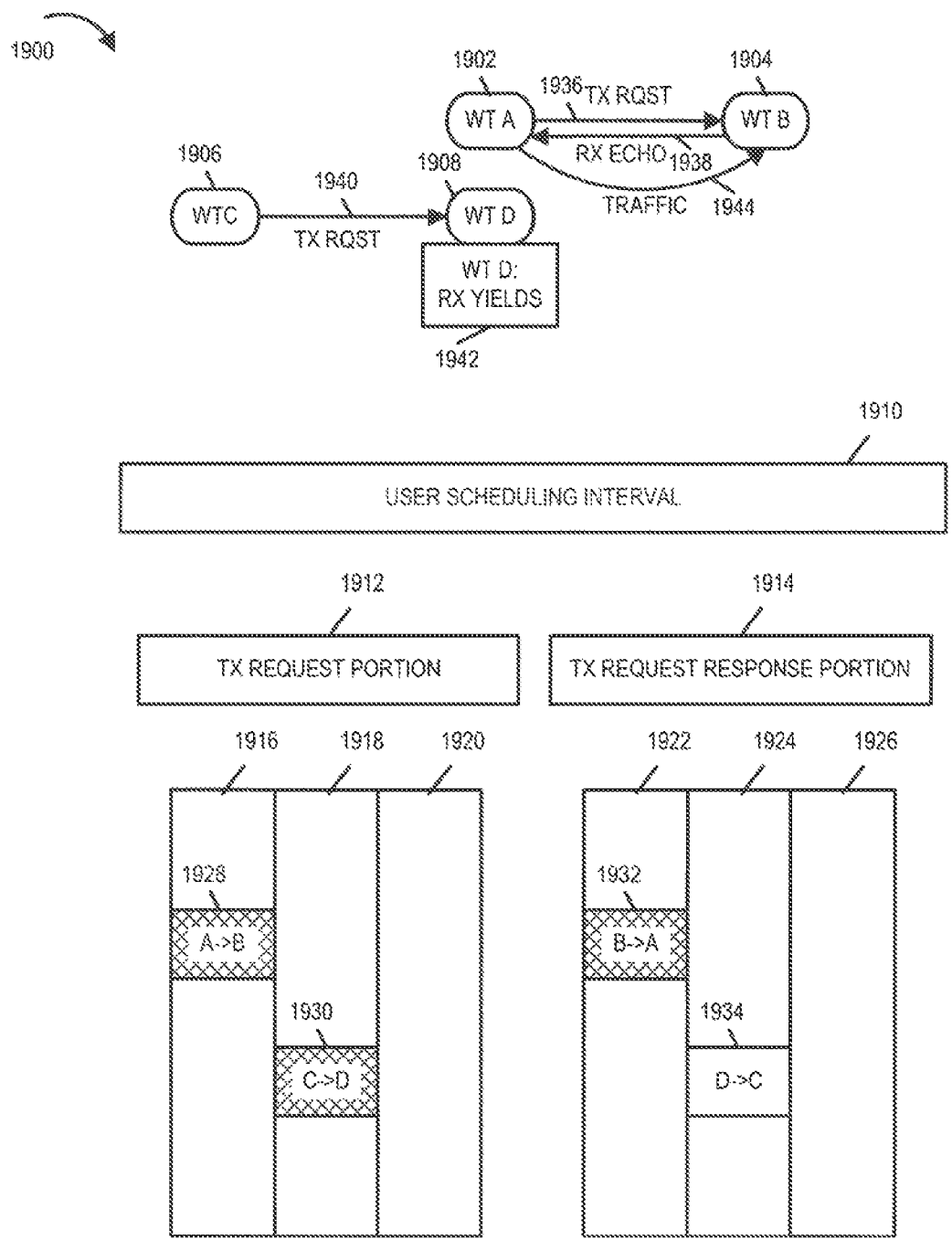
FIG. 10 is a drawing illustrating an example of peer to peer signaling utilizing a structure including a plurality of request intervals and a plurality of request response intervals.

FIG. 10 is a drawing 1900 illustrating an example of peer to peer signaling utilizing a structure including a plurality of request intervals and a plurality of request response intervals. The WTs of FIG. 10 are, e.g., any of the communications devices described with respect to FIGS. 5, 6, 7, and/or 8. In this example, wireless terminal (WT) A 1902 has a peer to peer connection with WT B 1904, and WT C 1906 has a peer to peer connection with WT D 1908. Assume for the purposes of the example, that WT A would like to transmit peer to peer traffic signals to WT B in this traffic slot, and that WT C would also like to transmit peer to peer traffic signals to WT D in this same traffic slot. Also assume for the purposes of this example, that WT A 1902 is located very close to WT D 1908.

Assume that WT A→WT B connection has higher priority than the WT C→WT D connection. The user scheduling interval 1910 includes transmission request portion 1912 and transmission request response portion 1914. Transmission request portion includes a first transmission request interval 1916 which conveys a first OFDM transmission request symbol, a second transmission request interval 1918 which conveys a second OFDM transmission request symbol, and a third transmission request interval 1920 which conveys a third OFDM transmission request symbol.

A request communicated in interval 1916 has higher priority than a request communicated in interval 1918, and a request communicated in interval 1918 has higher priority than a request communicated in interval 1920. In this example, OFDM tone-symbol 1928 of first request interval 1916 is reserved to carry a transmission request from WT A to WT B; and OFDM tone-symbol 1930 of second request interval 1918 is reserved to carry a transmission request from WT C to WT D.

Transmission request response portion 1914 includes a first transmission request response interval 1922 which conveys a first OFDM transmission request response symbol, a second transmission request response interval 1924 which conveys a second OFDM transmission request response symbol, and a third transmission request response interval 1926 which conveys a third OFDM transmission request response symbol.

A request response, e.g., RX echo signal, communicated in interval 1922 has higher priority than a request response communicated in interval 1924, and a request response communicated in interval 1924 has higher priority than a request response communicated in interval 1926. In this example, OFDM tone-symbol 1932 of first request response interval 1922 is reserved to carry a transmission request response, e.g., RX echo signal, from WT B to WT A; and OFDM tone-symbol 1934 of second request response interval 1924 is reserved to carry a transmission request response from WT D to WT C.

Exemplary signaling will now be described. WT A 1902 transmits TX request signal 1936 to WT B 1904 using tone-symbol 1928. Next, WT C 1906 transmits TX request signal 1940 to WT D 1908 using tone-symbol 1930.

Wireless terminal B transmits RX echo signal 1938 to WT A 1902 using tone-symbol 1932. Wireless terminal D 1908 has detected the TX request signal from WT A 1902, is aware that the WT A to WT B connection has higher priority than its own WT C to WT D connection and determines that the estimated interference from WT A 1902 is expected to exceed a threshold, e.g., its determined SNR is expected to be too low. Therefore, WT D 1908 performs receiver yielding and decides not to transmit an RX echo signal to WT C 1906, as indicated by box 1942 and the lack of crosshatch shading in OFDM tone-symbol 1934. Wireless terminal A 1902 transmits traffic signals 1944 to WT B in the traffic interval.

Figure 11:
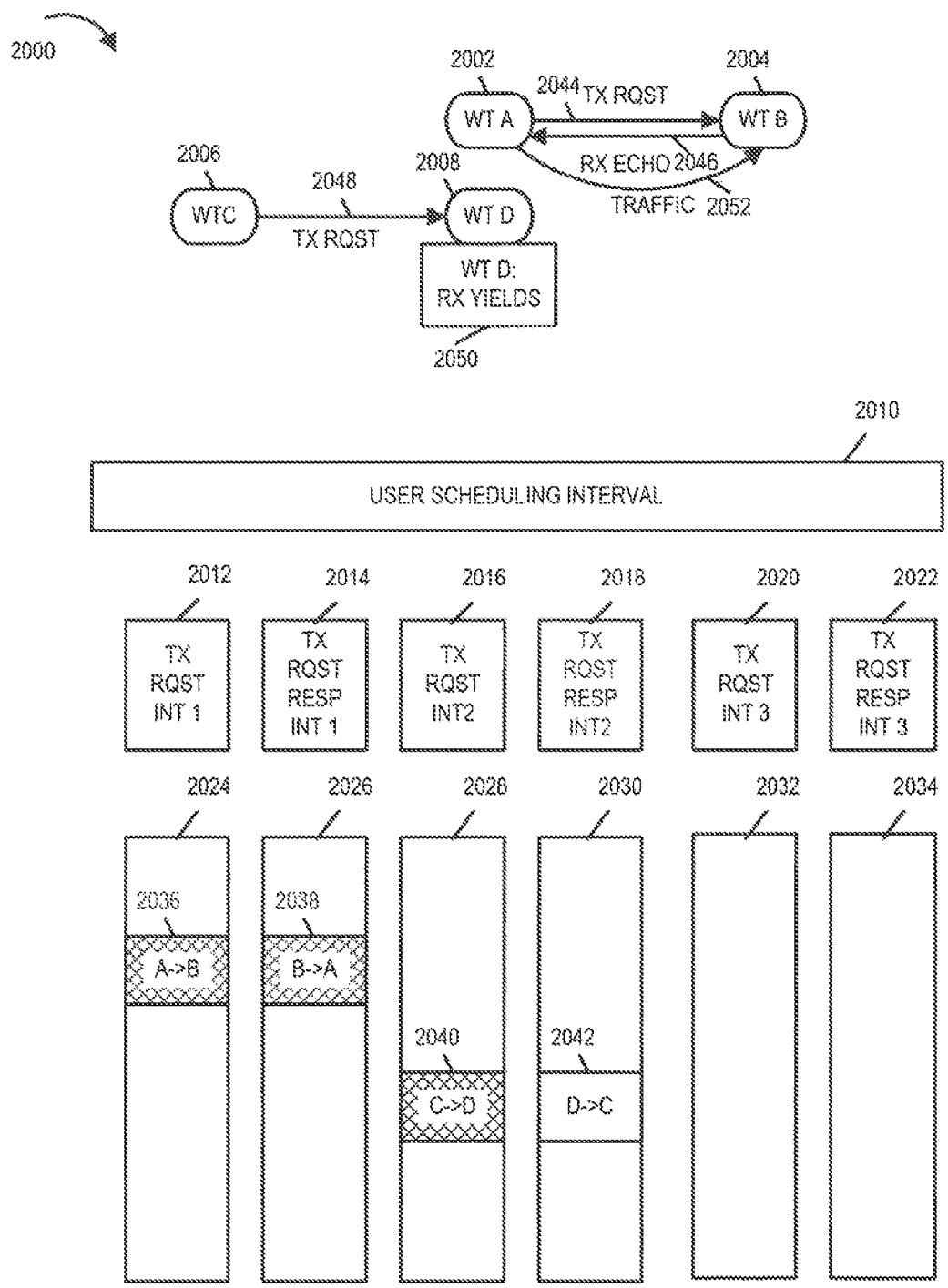
FIG. 11 is a drawing illustrating an example of peer to peer signaling utilizing a structure including a plurality of request intervals and a plurality of request response intervals in which the request and response intervals are interleaved.

FIG. 11 is a drawing 2000 illustrating an example of peer to peer signaling utilizing a structure including a plurality of request intervals and a plurality of request response intervals in which the request and response intervals are interleaved. The WTs of FIG. 11 are, e.g., any of the communications devices described with respect to FIGS. 5, 6, 7, and/or 8. In this example, wireless terminal (WT) A 2002 has a peer to peer connection with WT B 2004, and WT C 2006 has a peer to peer connection with WT D 2008. Assume for the purposes of the example, that WT A 2002 would like to transmit peer to peer traffic signals to WT B 2004 in this traffic slot, and that WT C 2006 would also like to transmit peer to peer traffic signals to WT D 2008 in this same traffic slot. Also assume for the purposes of this example, that WT A 2002 is located very close to WT D 2008.

Assume that WT A→WT B connection has higher priority than the WT C→WT D connection. User scheduling interval 2010 includes TX request interval 1 2012, followed by TX request response interval 1 2014, followed by TX request interval 2 2016, followed by TX request response interval 2 2018, followed by TX request interval 3 2020, followed by TX request response interval 3 2022.

First transmission request symbol 2024 is conveyed during TX request interval 1 2012; first transmission request response symbol 2026 is conveyed during TX request response interval 2014; second transmission request symbol 2028 is conveyed during TX request interval 2 2016; second transmission request response symbol 2030 is conveyed during TX request response interval 2 2018; third transmission request symbol 2032 is conveyed during TX request interval 3 2020; third transmission request response symbol 2034 is conveyed during TX request response interval 2022.

A request communicated in interval 2012 has higher priority than a request communicated in interval 2016, and a request communicated in interval 2016 has higher priority than a request communicated in interval 2020. In this example, OFDM tone-symbol 2036 of first request interval symbol 2024 is reserved to carry a transmission request from WT A to WT B; and OFDM tone-symbol 2040 of second request interval symbol 2028 is reserved to carry a transmission request from WT C to WT D.

A request response, e.g., RX echo signal, communicated in interval 2014 has higher priority than a request response communicated in interval 2108, and a request response communicated in interval 2018 has higher priority than a request response communicated in interval 2022. In this example, OFDM tone-symbol 2038 of first request response interval symbol 2026 is reserved to carry a transmission request response, e.g., RX echo signal, from WT B to WT A; and OFDM tone-symbol 2042 of second request response interval symbol 2030 is reserved to carry a transmission request response from WT D to WT C.

Exemplary signaling will now be described. WT A 2002 transmits TX request signal 2044 to WT B 2004 using tone-symbol 2036. Next, WT B 2004 transmits RX echo signal 2046 to WT A 2002. WT C 2006 transmits TX request 2048 to WT D 2008 using OFDM tone-symbol 2040.

Wireless terminal D 2008 has detected the TX request signal from WT A 2002, is aware that the WT A to WT B connection has higher priority than its own WT C to WT D connection and determines that the estimated interference from WT A 2002 is expected to exceed a threshold, e.g., its determined SNR is expected to be too low. Therefore, WT D 2008 performs receiver yielding and decides not to transmit an RX echo signal to WT C 2006, as indicated by box 2050 and the lack of crosshatch shading in OFDM tone-symbol 2042. Wireless terminal A 2002 transmits traffic signals 2052 to WT B 2004 in the traffic interval.

Figure 12:
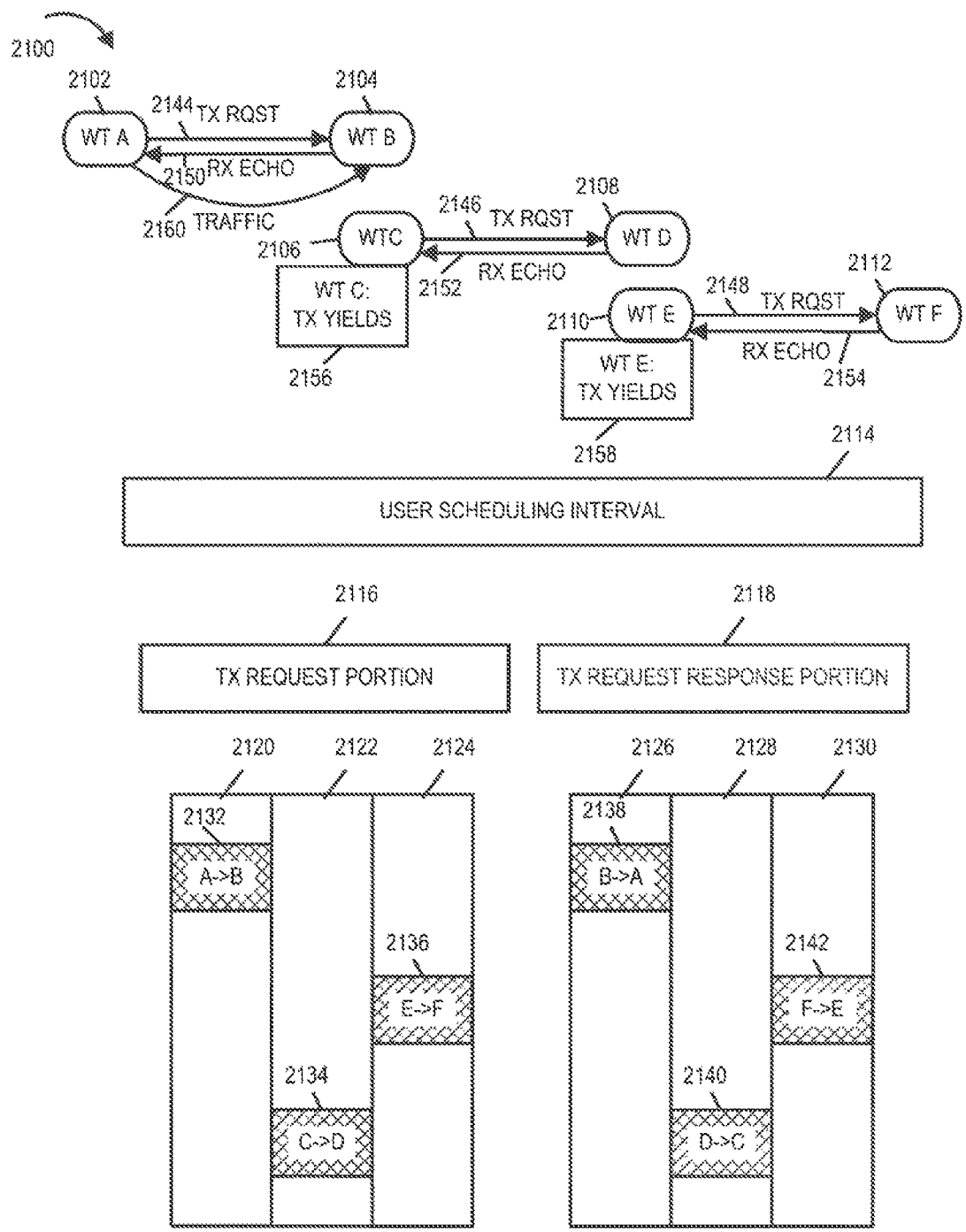
FIG. 12 is a drawing illustrating an example of peer to peer signaling utilizing a structure including a plurality of request intervals and a plurality of request response intervals.

FIG. 12 is a drawing 2100 illustrating an example of peer to peer signaling utilizing a structure including a plurality of request intervals and a plurality of request response intervals. The WTs of FIG. 12 are, e.g., any of the communications devices described with respect to FIGS. 5, 6, 7, and/or 8. In this example, wireless terminal (WT) A 2102 has a peer to peer connection with WT B 2104, and WT C 2106 has a peer to peer connection with WT D 2108, and WT E 2110 has a peer to peer connection with WT F 2112. Assume for the purposes of the example, that WT A would like to transmit peer to peer traffic signals to WT B in this traffic slot, and that WT C would also like to transmit peer to peer traffic signals to WT D in this same traffic slot, and that WT E would like to transmit peer to peer traffic signals to WT F 2112 in this same traffic slot. Also assume for the purposes of this example, that WT B 2102 is located very close to WT C 2106, and that WT D is located very close to WT E 2110.

Assume that WT A→WT B connection has higher priority than the WT C→WT D connection, and that the WT C→WT D connection has higher priority than the WT E→WT F connection. The user scheduling interval 2114 includes transmission request portion 2116 and transmission request response portion 2118. Transmission request portion 2116 includes a first transmission request interval 2120 which conveys a first OFDM transmission request symbol, a second transmission request interval 2122 which conveys a second OFDM transmission request symbol, and a third transmission request interval 2124 which conveys a third OFDM transmission request symbol.

A request communicated in interval 2120 has higher priority than a request communicated in interval 2122, and a request communicated in interval 2122 has higher priority than a request communicated in interval 2124. In this example, OFDM tone-symbol 2132 of first request interval 2120 is reserved to carry a transmission request from WT A to WT B; and OFDM tone-symbol 2134 of second request interval 2122 is reserved to carry a transmission request from WT C to WT D; and OFDM tone-symbol 2136 of third request interval 2124 is reserved to carry a transmission request from WT E to WT F.

Transmission request response portion 2118 includes a first transmission request response interval 2126 which conveys a first OFDM transmission request response symbol, a second transmission request response interval 2128 which conveys a second OFDM transmission request response symbol, and a third transmission request response interval 2130 which conveys a third OFDM transmission request response symbol.

A request response, e.g., RX echo signal, communicated in interval 2126 has higher priority than a request response communicated in interval 2128, and a request response communicated in interval 2128 has higher priority than a request response communicated in interval 2130. In this example, OFDM tone-symbol 2138 of first request response interval 2126 is reserved to carry a transmission request response, e.g., RX echo signal, from WT B to WT A; and OFDM tone-symbol 2140 of second request response interval 2128 is reserved to carry a transmission request response from WT D to WT C; and OFDM tone-symbol 2142 of third request response interval 2130 is reserved to carry a transmission request response from WT F to WT E.

Exemplary signaling will now be described. WT A 2102 transmits TX request signal 2144 to WT B 2104 using tone-symbol 2132. Next, WT C 2106 transmits TX request signal 2146 to WT D 2108 using tone-symbol 2134. Next, WT E 2110 transmits TX request signal 2148 to WT F 2112 using tone-symbol 2136.

Wireless terminal B 2104 transmits RX echo signal 2150 to WT A 2102 using tone-symbol 2138. WT D 2108 transmits RX echo signal 2152 to WT C 2106 using tone-symbol 2140. WT F 2112 transmits RX echo signal 2154 to WT E 2110 using tone-symbol 2142.

WT C 2106 has received the RX echo signal 2150 from WT B 2104, which it recognizes as corresponding to a higher priority connection (WT A→B), than its own connection (WT C→WT D), determines that the expected interference level that WT C would generate to WT B is above a threshold, and decides to perform TX yielding, as indicated by box 2156. Therefore, WT C decides not to transmit traffic data signals so as to reduce interference to WT B reception of traffic signals.

WT E 2110 has received the RX echo signal 2152 from WT D 2108, which it recognizes as corresponding to a higher priority connection (WT C→D), than its own connection (WT E→WT F), determines that the expected interference level that WT E would generate to WT D is above a threshold, and decides to perform TX yielding, as indicated by box 2158. Therefore, WT E decides not to transmit traffic data signals so as to reduce interference to WT D reception of traffic signals.

WT A transmits traffic signals 2160 during the traffic interval to WT B 2104. Wireless terminals C and E both refrain from transmitting traffic signals during the traffic interval.

Figure 13:
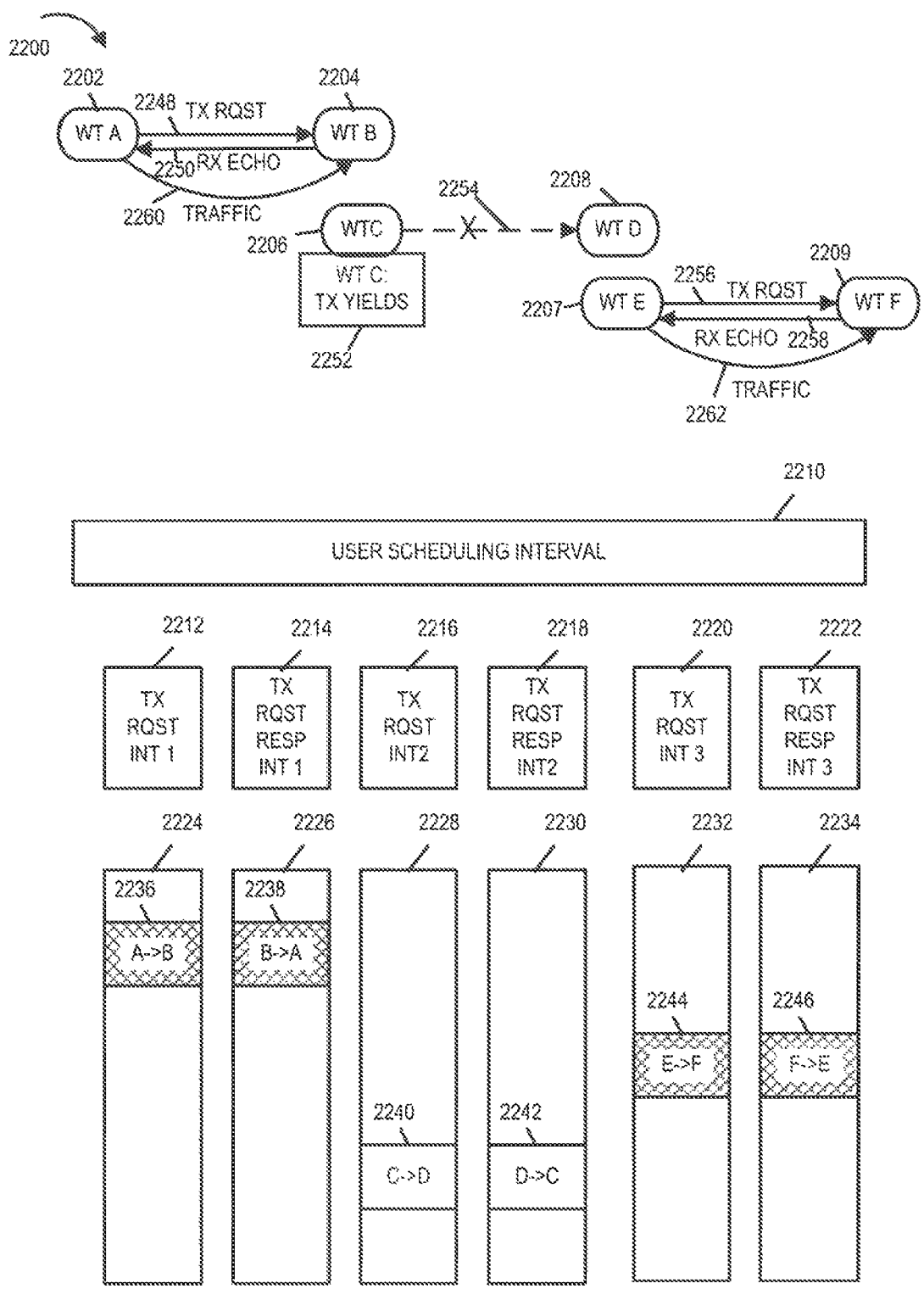
FIG. 13 is a drawing illustrating an example of peer to peer signaling utilizing a structure including a plurality of request intervals and a plurality of request response intervals in which the request and response intervals are interleaved.

FIG. 13 is a drawing 2200 illustrating an example of peer to peer signaling utilizing a structure including a plurality of request intervals and a plurality of request response intervals in which the request and response intervals are interleaved. The WTs of FIG. 13 are, e.g., any of the communications devices described with respect to FIGS. 5, 6, 7, and/or 8. In this example, wireless terminal (WT) A 2202 has a peer to peer connection with WT B 2204; WT C 2206 has a peer to peer connection with WT D 2208; and WT E 2207 has a peer to peer connection with WT F 2209. Assume for the purposes of the example that WT A 2202 would like to transmit peer to peer traffic signals to WT B 2204 in this traffic slot, that WT C 2206 would like to transmit peer to peer traffic signals to WT D 2208 in this same traffic slot; and that WT E 2207 would like to transmit peer to peer traffic signals to WT F 2209 in this same traffic slot. Also assume for the purposes of this example, that WT B 2204 is located very close to WT C 2206, and that WT D 2208 is located very close to WT E 2207.

Assume that WT A→WT B connection has higher priority than the WT C→WT D connection, and that the WT C→WT D connection has higher priority than the WT E→WT F connection. User scheduling interval 2210 includes TX request interval 1 2212, followed by TX request response interval 1 2214, followed by TX request interval 2 2216, followed by TX request response interval 2 2218, followed by TX request interval 3 2220, followed by TX request response interval 3 2222.

First transmission request symbol 2224 is conveyed during TX request interval 1 2212; first transmission request response symbol 2226 is conveyed during TX request response interval 2214; second transmission request symbol 2228 is conveyed during TX request interval 2 2216; second transmission request response symbol 2230 is conveyed during TX request response interval 2 2218; third transmission request symbol 2232 is conveyed during TX request interval 3 2220; third transmission request response symbol 2234 is conveyed during TX request response interval 3 2222.

A request communicated in interval 2212 has higher priority than a request communicated in interval 2216, and a request communicated in interval 2216 has higher priority than a request communicated in interval 2220. In this example, OFDM tone-symbol 2236 of first request interval symbol 2224 is reserved to carry a transmission request from WT A to WT B; OFDM tone-symbol 2240 of second request interval symbol 2228 is reserved to carry a transmission request from WT C to WT D; and OFDM tone-symbol 2244 of third request interval symbol 2232 is reserved to carry a transmission request from WT E to WT F.

A request response, e.g., RX echo signal, communicated in interval 2214 has higher priority than a request response communicated in interval 2218, and a request response communicated in interval 2218 has higher priority than a request response communicated in interval 2222. In this example, OFDM tone-symbol 2238 of first request response interval symbol 2226 is reserved to carry a transmission request response, e.g., RX echo signal, from WT B to WT A; OFDM tone-symbol 2242 of second request response interval symbol 2230 is reserved to carry a transmission request response from WT D to WT C; and OFDM tone-symbol 2246 of third request response interval symbol 2234 is reserved to carry a transmission request response from WT F to WT E.

Exemplary signaling will now be described. WT A 2202 transmits TX request signal 2248 to WT B 2204 using tone-symbol 2236. Next, WT B 2204 transmits RX echo signal 2250 to WT A 2202.

WT C has detected the RX echo signal from WT B, recognizes that it corresponds to a higher priority connection (WT A-WT B) than its own connection (WT C→WT D), determines an estimated interference level that WT C expects it would impose at WT B's receiver if it transmitted traffic signals. In this example, the estimated interference level exceeds a threshold; therefore WT C performs transmitter yielding as indicated by box 2252. Since WT C has decided to yield, it does not transmit an TX request signal to WT D in OFDM tone-symbol 2240, as indicated by crossed out dotted line 2254 and no crosshatch shading in OFDM tone-symbol 2240.

Since WT C has not transmitted a TX request, WT D does not transmit an RX echo on OFDM tone-symbol 2242 as indicated by no crosshatch shading in block 2242.

WT E 2207 transmits TX request signal 2256 to WT F 2209 using OFDM ton-symbol 2244. WT F responds by transmitting RX echo signal 2258 to WT E using OFDM tone-symbol 2246.

WT A transmits traffic signals 2260 to WT B 2204 in the traffic interval, and WT E 2207 transmits traffic signals 2262 to WT F 2209 in the same traffic interval. Note that the approach presented in FIG. 13, utilizing interleaved request and response intervals, allows WT E to WT F to communicate peer to peer traffic signals concurrently with WT A to WT B peer to peer traffic signals, while with the approach of FIG. 12, WT A transmits peer to peer traffic to WT B, but WT E does not transmit peer to peer traffic to WT F.

Figure 14:
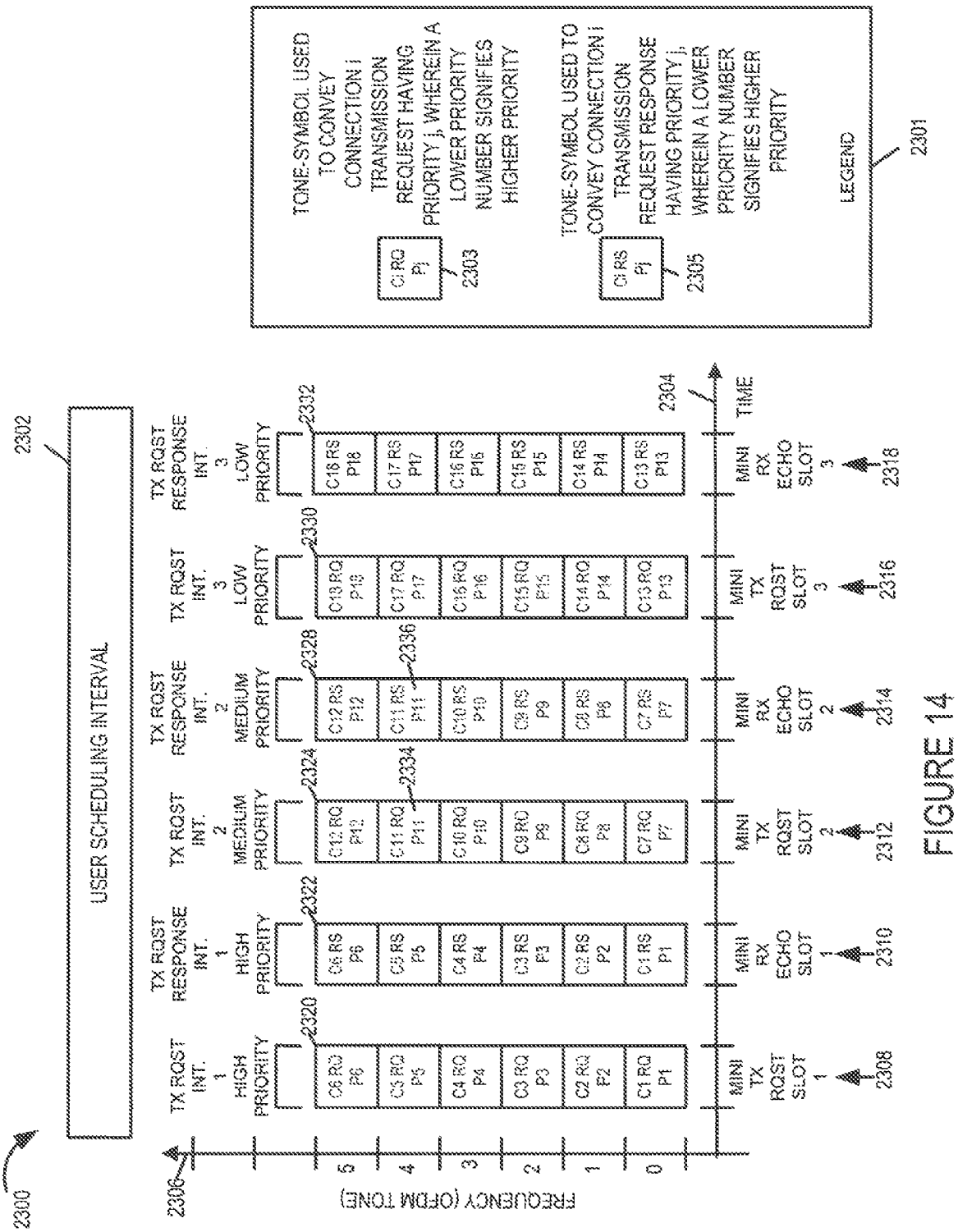
FIG. 14 is a drawing illustrating an exemplary user scheduling interval in a peer to peer recurring timing structure and an exemplary partition of air link resources of the user scheduling portion.

FIG. 14 is a drawing 2300 illustrating an exemplary user scheduling interval 2302 in a peer to peer recurring timing structure and an exemplary partition of air link resources of the user scheduling portion. The WTs of FIG. 14 are, e.g., any of the communications devices described with respect to FIGS. 5, 6, 7, and/or 8. The exemplary user scheduling interval 2302 includes: (i) transmission request interval 1 2308 associated with high priority, and otherwise referred to as mini TX request slot 1; (ii) transmission request response interval 1 2310 associated with high priority, and otherwise referred to as mini RX echo slot 1; (iii) transmission request interval 2 2312 associated with medium priority, and otherwise referred to as mini TX request slot 2; (iv) transmission request response interval 2 2314 associated with medium priority, and otherwise referred to as mini RX echo slot 2; (v) transmission request interval 3 2316 associated with low priority, and otherwise referred to as mini TX request slot 3; (iv) transmission request response interval 3 2318 associated with low priority, and otherwise referred to as mini RX echo slot 3.

Intervals (2308, 2312, 2316) are designated to carry transmission request signals (TX request signals) while intervals (2310, 2314, 2318) are designated to carry transmission request response signals (RX echo signals).

Horizontal axis 2304 represents time, while vertical axis 2306 represents frequency, e.g., OFDM tones. OFDM symbol 2320 carries transmission request signals for connections mapped into a position in the first transmission request interval 2308. OFDM symbol 2322 carries transmission request response signals for connections mapped into a position in the first transmission request response interval 23 10. OFDM symbol 2324 carries transmission request signals for connections mapped into a position in the second transmission request interval 2312. OFDM symbol 2328 carries transmission request response signals for connections mapped into a position in the second transmission request response interval 2314. OFDM symbol 2330 carries transmission request signals for connections mapped into a position in the third transmission request interval 2316. OFDM symbol 2332 carries transmission request response signals for connections mapped into a position in the third transmission request response interval 2318.

Legend 2301 includes an exemplary OFDM tone-symbol 2303 used to carry a transmission request for the traffic interval for the connection designated "i" with connection being designated to have priority "j", wherein a lower priority designation number signifies a higher priority level. Legend 2301 also includes an exemplary OFDM tone-symbol 2305 used to carry a transmission request response for the traffic interval for the connection designated "i" with the connection being designated to have priority "j". In this example, i is an integer in the range of 1 to 18, and j is an integer in the range of 1 to 18.

In this example, there are positions available to support control user scheduling signaling corresponding to 18 peer to peer one-way connections for a traffic interval. For example, consider exemplary connection C11. Assume that connection C11 is currently associated with traffic signals from WT A to WT B. Tone symbol 2334 is reserved to carry a transmission request from WT A to WT B, while tone-symbol 2336 is reserved to carry a transmission request response signal, e.g., RX echo signal, from WT B to WT A. The priority level associated with this connection is "11".

Assume that WT A has traffic that it would like to transmit to WT B. Wireless terminal A monitors for request response signals corresponding to higher priority connections, e.g., request response resources having any of priority numbers 1, 2, 3, 4, 5, 6, 7, 8, 9, 10. WT A determines, for the detected higher priority connections, expected interference level that it would cause a receiver associated with the higher priority connection, and then determines if the expected interference level is below a threshold. If the level exceeds a threshold, then WT A yields the traffic interval and refrains from transmitting traffic signals. In cases where the request response which caused the transmitter yielding occurred during a prior slot with respect to its own request response location, e.g., occurred in transmission request response interval 2322, WT A can refrain from transmitting its intended transmission request in OFDM tone-symbol 2334 in addition to refraining to transmit traffic signals in the traffic interval.

Now we will consider the example from the perspective of the intended receiver of the traffic signals WT B. Again assume that WT A has traffic that it would like to transmit to WT B, and WT A transmits a transmission request in OFDM tone-symbol 2334. Wireless terminal B monitors for transmission request signals corresponding to its own connection, e.g., OFDM tone-symbol 2336, and to higher priority connections, e.g., request resources having any of priority numbers 1, 2, 3, 4, 5, 6, 7, 8, 9, 10 and stores information relating to those received request signals. WT B determines an expected received signal quality value, e.g., an SNR or SIR value, that it expects at its receiver if it allows WT A to transmit traffic signals to WT B. WT B compares the determined expected receive quality value to a threshold, and if it is below the threshold, then WT B decides to yield the traffic transmission resource and does not send an RX echo signal to WT A.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, transmitting a first control signal to a second communications device in a first symbol having a first symbol period, transmitting user data to the second communications device on a second symbol having a second symbol period, the first and second symbol periods being different, monitoring for signals from other devices, determining an amount of interference, comparing determined interference to a threshold level, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as wireless terminals are configured to perform the steps of the methods described as being as being performed by the communications device. The configuration of the processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first device having a first connection with a second device, said first and second devices being peer to peer communications devices, the method comprising:

monitoring, by the first device, a first transmission request response interval corresponding to a second connection between a third device and a fourth device, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities;

determining, by the first device, whether to transmit a transmission request during said first user scheduling interval based on whether a transmission request response for transmission of data was received during said monitoring from one or more communications between the third device and the fourth device corresponding to the second connection; and if it is determined that a transmission request should not be transmitted based on the received transmission request response, refraining from using a transmission request interval corresponding to the first connection and refraining from transmitting traffic during said first traffic interval, wherein said transmission request interval is one of a plurality of transmission request intervals in the first user scheduling interval, said transmission request intervals being interleaved with corresponding transmission request response intervals during the first user scheduling interval, and wherein the transmission request intervals are ordered in the first user scheduling interval according to transmission priority, transmission request intervals corresponding to connections having higher transmission priority occurring within the first user scheduling interval before transmission request intervals corresponding to connections having lower priorities.

2. The method of claim 1, further comprising:
if it is determined that a transmission request should be transmitted based on the determination that no transmission request response was received, transmitting a transmission request during a transmission request interval corresponding to the first connection during said first user scheduling interval.

3. The method of claim 2, wherein said transmission request interval corresponding to the first connection follows a first transmission request interval corresponding to connections having higher priority than said first connection and said first transmission request response interval.

4. The method of claim 3, further comprising:
monitoring a second transmission request response interval the second transmission request response interval corresponding to said transmission request interval corresponding to the first connection for responses to transmission requests transmitted during said transmission request interval.

5. The method of claim 4, further comprising:
determining whether to transmit traffic data during said first traffic interval based on signals detected by said monitoring during said second transmission request interval.

6. The method of claim 5, wherein determining whether to transmit traffic data includes:
determining if a response to the transmitted transmission request was received; and
determining whether a response to a transmission request corresponding to a connection having a higher priority than said first connection was received during said second transmission request response interval.

7. The method of claim 6, further comprising:
when it is determined that a response to a transmission request corresponding to a connection having a higher priority than said first connection was received,
generating an interference cost estimate, as a function of the response signal corresponding to the higher priority connection, received during the second transmission request response interval, said generated interference cost estimate estimating interference which will be caused if the first device transmits traffic data.

8. The method of claim 7, wherein when it is determined that a response to the transmitted transmission request was received and the generated interference cost estimate is below a threshold, it is determined that traffic data is to be transmitted during said first traffic interval, the method further comprising:
transmitting traffic data to the second communication device during the first traffic interval when it is determined that traffic data is to be transmitted during said first traffic interval.

9. The method of claim 1, wherein determining whether to transmit a transmission request includes:
if it is determined that the transmission request response corresponding to the second connection was received during said first transmission request response interval,
i) generating an interference cost estimate as a function of the received response corresponding to said second connection, said interference cost estimate estimates interference which will be caused if the first device transmits traffic data; and ii) deciding not to transmit the transmission request when said interference cost estimate exceeds a threshold.

10. A first device having a first connection with a second device, said first and second devices being peer to peer communications devices, the first device comprising:
a first monitoring module for monitoring a first transmission request response interval corresponding to a second connection between a third device and a fourth device, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities;
a transmission request determination module for determining whether to transmit a transmission request during said first user scheduling interval based on whether a transmission request response for transmission of data was received during said monitoring from one or more communications between the third device and the fourth device corresponding to the second connection;
a transmission module for transmitting transmission requests; and
a control module for controlling said transmission module to transmit a transmission request using a transmission request interval corresponding to the first connection when said determination module determines a transmission request is to be transmitted and for controlling the transmission module to refrain from transmitting using the transmission request interval corresponding to the first connection when it is determined that a transmission request should not be transmitted,
wherein said transmission request interval is one of a plurality of transmission request intervals in the first user scheduling interval, said transmission request intervals being interleaved with corresponding transmission request response intervals during the first user scheduling interval, and
wherein the transmission request intervals are ordered in the first user scheduling interval according to transmission priority, transmission request intervals corresponding to connections having higher transmission priority occurring within the first user scheduling interval before transmission request intervals corresponding to connections having lower priorities.

11. The first device of claim 10, further comprising:
a transmission request generation module for generating a transmission request when it is determined that a transmission request should be transmitted based on the determination that no transmission request response was received; and
wherein said control module controls the transmission module to transmit the generated transmission request during a transmission request interval corresponding to the first connection during said first user scheduling interval.

12. The first device of claim 11, wherein said transmission request interval corresponding to the first connection follows a first transmission request interval corresponding to connections having higher priority than said first connection and said first transmission request response interval.

13. The first device of claim 10, wherein said determination module includes:
an interference cost estimation module for estimating an interference cost estimate as a function of the received response corresponding to said second connection, said interference cost estimate estimating interference which will be caused if the first device transmits traffic data.

14. The first device of claim 12, further comprising:
a second monitoring module for monitoring a second transmission request response interval the second transmission request response interval corresponding to said transmission request interval corresponding to the first connection for responses to transmission requests transmitted during said transmission request interval.

15. The first device of claim 14, further comprising:
a threshold comparison module for comparing a generated interference cost estimate to a threshold used to determine if traffic data is to be transmitted.

16. A first device having a first connection with a second device, said first and second devices being peer to peer communications devices, the first device comprising:
first monitoring means for monitoring a first transmission request response interval corresponding to a second connection between a third device and a fourth device, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities;
transmission request determination means for determining whether to transmit a transmission request during said first user scheduling interval based on whether a transmission request response for transmission of data was received during said monitoring from one or more communications between the third device and the fourth device corresponding to the second connection;
transmission means for transmitting transmission requests; and
control means for controlling said transmission means to transmit a transmission request using a transmission request interval corresponding to the first connection when said determination means determines a transmission request is to be transmitted and for controlling the transmission means to refrain from transmitting using the transmission request interval corresponding to the first connection when it is determined that a transmission request should not be transmitted,
wherein said transmission request interval is one of a plurality of transmission request intervals in the first user scheduling interval, said transmission request intervals being interleaved with corresponding transmission request response intervals during the first user scheduling interval, and
wherein the transmission request intervals are ordered in the first user scheduling interval according to transmission priority, transmission request intervals corresponding to connections having higher transmission priority occurring within the first user scheduling interval before transmission request intervals corresponding to connections having lower priorities.

17. The first device of claim 16, further comprising:
transmission request generation means for generating a transmission request when it is determined that a transmission request should be transmitted based on the determination that no transmission request response was received; and
wherein said control means controls the transmission means to transmit the generated transmission request during a transmission request interval corresponding to the first connection during said first user scheduling interval.

18. The first device of claim 17, wherein said transmission request interval corresponding to the first connection follows a first transmission request interval corresponding to connections having higher priority than said first connection and said first transmission request response interval.

19. A non-transitory computer readable medium embodying machine executable instructions for controlling a first device, said first device having a first connection with a second device, said first and second devices being peer to peer communications devices, said instructions configured to:
monitor a first transmission request response interval corresponding to a second connection between a third device and a fourth device, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities;
determine whether to transmit a transmission request during said first user scheduling interval based on whether a transmission request response for transmission of data was received during said monitoring from one or more communications between the third device and the fourth device corresponding to the second connection; and
if it is determined that a transmission request should not be transmitted based on the received transmission request response, refrain from using a transmission request interval corresponding to the first connection and refrain from transmitting traffic during said first traffic interval,
wherein said transmission request interval is one of a plurality of transmission request intervals in the first user scheduling interval, said transmission request intervals being interleaved with corresponding transmission request response intervals during the first user scheduling interval, and
wherein the transmission request intervals are ordered in the first user scheduling interval according to transmission priority, transmission request intervals corresponding to connections having higher transmission priority occurring within the first user scheduling interval before transmission request intervals corresponding to connections having lower priorities.

20. The computer readable medium of claim 19, wherein said instructions further comprise:
if it is determined that a transmission request should be transmitted based on the determination that no transmission request response was received, transmit a transmission request during a transmission request interval corresponding to the first connection during said first user scheduling interval.

21. The computer readable medium of claim 20, wherein said transmission request interval corresponding to the first connection follows a first transmission request interval corresponding to connections having higher priority than said first connection and said first transmission request response interval.

22. An apparatus comprising:
a processor configured to control a first device, said first device having a first connection with a second device, said first and second devices being peer to peer communications devices, said processor further configured to:
monitor a first transmission request response interval corresponding to a second connection between a third device and a fourth device, the first transmission request response interval being one of a plurality of transmission request response intervals in a first user scheduling interval corresponding to a first traffic interval, said transmission request response intervals being ordered according to transmission priority, transmission request response intervals corresponding to connections having higher transmission priority occurring within said first user scheduling interval before transmission request response intervals corresponding to connections having lower priorities;
determine whether to transmit a transmission request during said first user scheduling interval based on whether a transmission request response for transmission of data was received during said monitoring from one or more communications between the third device and the fourth device corresponding to the second connection; and
if it is determined that a transmission request should not be transmitted based on the received transmission request response, refrain from using a transmission request interval corresponding to the first connection and refrain from transmitting traffic during said first traffic interval,
wherein said transmission request interval is one of a plurality of transmission request intervals in the first user scheduling interval, said transmission request intervals being interleaved with corresponding transmission request response intervals during the first user scheduling interval, and
wherein the transmission request intervals are ordered in the first user scheduling interval according to transmission priority, transmission request intervals corresponding to connections having higher transmission priority occurring within the first user scheduling interval before transmission request intervals corresponding to connections having lower priorities.

23. The apparatus of claim 22, wherein said processor is further configured to:
if it is determined that a transmission request should be transmitted based on the determination that no transmission request response was received, transmit a transmission request during a transmission request interval corresponding to the first connection during said first user scheduling interval.

24. The apparatus of claim 23, wherein said transmission request interval corresponding to the first connection follows a first transmission request interval corresponding to connections having higher priority than said first connection and said first transmission request response interval.

25. A method of operating a second device having a first connection with a first device, said first and second devices being peer to peer communications devices, the method comprising:
monitoring, by the second device, during a user scheduling interval for transmission requests corresponding to a second connection having a higher priority than said first connection and for a transmission request from said first device, said second connection being between a third device and a fourth device;
storing, using a memory of the second device, transmission request response information for transmission of data corresponding to one or more transmission requests between the third device and the fourth device corresponding to said second connection detected by said monitoring; and
if a transmission request from the first device is detected by said monitoring, determining, by the second device, whether to transmit a transmission request response based on a received signal quality value generated from the stored transmission request response information for transmission of data corresponding to the one or more transmission requests between the third device and the fourth device,
wherein transmission requests are transmitted during transmission request intervals, said user scheduling interval including multiple transmission request intervals and corresponding transmission request response intervals,
wherein said transmission request intervals are interleaved with corresponding transmission request response intervals during said user scheduling interval, and
wherein said transmission request intervals are ordered in said user scheduling interval according to transmission priority, transmission request intervals corresponding to connections having higher transmission priority occurring within said user scheduling interval before transmission request intervals corresponding to connections having lower priorities.

26. The method of claim 25, wherein determining whether to transmit a transmission request response includes comparing the generated received signal quality value to a threshold.

27. The method of claim 25, further comprising:
in response to determining to transmit a transmission request response, transmitting a transmission request response in a transmission request response interval corresponding to the transmission request interval in which the transmission request corresponding to the first connection was received; and
receiving user data transmitted by the first device in a traffic interval.

28. The method of claim 25, further comprising:
in response to determining not to transmit a transmission request response, refraining from transmitting a transmission request response in a transmission request response interval corresponding to the transmission request interval in which the transmission request corresponding to the first connection was received.

29. A second device having a first connection with a first device, said first and second devices being peer to peer communications devices, the second device comprising:
a monitoring module for monitoring to detect during a user scheduling interval transmission requests corresponding to a second connection having a higher priority than said first connection and for a transmission request from said first device, said second connection being between a third device and a fourth device;
memory storing transmission request response information for transmission of data corresponding to one or more transmission requests between the third device and the fourth device corresponding to said second connection detected by said monitoring;
a transmission request response determination module for determining whether to transmit a transmission request response based on a received signal quality value generated from the stored transmission request response information for transmission of data corresponding to the one or more transmission requests between the third device and the fourth device in response to a transmission request from the first device detected by said monitoring module; and memory storing timing structure information, said timing structure information identifying a set of ordered transmission request intervals corresponding to different priority levels, transmission request intervals corresponding to connections having higher transmission priority occurring within said user scheduling interval before transmission request intervals corresponding to connections having lower priorities, wherein transmission requests are transmitted during the transmission request intervals, said user scheduling interval including multiple transmission request intervals and corresponding transmission request response intervals, and wherein said transmission request intervals are interleaved with corresponding transmission request response intervals during said user scheduling interval.

30. The second device of claim 29, wherein said determination module includes a threshold comparison module for comparing the generated received signal quality value to a threshold.

31. The second device of claim 29, further comprising:
a transmission request response generation module; and
a transmission module transmitting a transmission request response in a transmission request response interval corresponding to a transmission request interval in which a transmission request corresponding to the first connection was received;
a wireless receiver module for receiving user data signals transmitted by the first device during a traffic interval; and
a user data decoder module for decoding the user data signals received by said wireless receiver module.

32. The second device of claim 29, further comprising:
a control module for controlling said transmission module to refrain from transmitting a transmission request response in a transmission request response interval in which the transmission request corresponding to the first connection was received when said determination module determines that a transmission request response should not be transmitted in response to a detected transmission request corresponding to the first connection.

33. A second device having a first connection with a first device, said first and second devices being peer to peer communications devices, the second device comprising:
monitoring means for monitoring to detect during a user scheduling interval transmission requests corresponding to a second connection having a higher priority than said first connection and for a transmission request from said first device, said second connection being between a third device and a fourth device;
memory storage means for storing transmission request response information for transmission of data corresponding to one or more transmission requests between the third device and the fourth device corresponding to said second connection detected by said monitoring;
transmission request response determination means for determining whether to transmit a transmission request response based on a received signal quality value generated from the stored transmission request response information for transmission of data corresponding to the one or more transmission requests between the third device and the fourth device in response to a transmission request from the first device detected by said monitoring means; and memory storage means for storing timing structure information, said timing structure information identifying a set of ordered transmission request intervals corresponding to different priority levels, transmission request intervals corresponding to connections having higher transmission priority occurring within said user scheduling interval before transmission request intervals corresponding to connections having lower priorities, wherein transmission requests are transmitted during the transmission request intervals, said user scheduling interval including multiple transmission request intervals and corresponding transmission request response intervals, and wherein said transmission request intervals are interleaved with corresponding transmission request response intervals during said user scheduling interval.

34. The second device of claim 33,
wherein said monitoring means includes transmission request interval monitoring means for monitoring transmission request intervals including a transmission request interval during which a transmission request from the first device may be transmitted and any preceding transmission request intervals in said user scheduling interval.

35. A non-transitory computer readable medium embodying machine executable instructions for controlling a second device, said second device having a first connection with a first device, said first and second devices being peer to peer communications devices, said instructions configured to:
monitor during a user scheduling interval for transmission requests corresponding to a second connection having a higher priority than said first connection and for a transmission request from said first device, said second connection being between a third device and a fourth device;
store transmission request response information for transmission of data corresponding to one or more transmission requests between the third device and the fourth device corresponding to said second connection detected by said monitoring; and
if a transmission request from the first device is detected by said monitoring, determine whether to transmit a transmission request response based on a received signal quality value generated from the stored transmission request response information for transmission of data corresponding to the one or more transmission requests between the third device and the fourth device, wherein transmission requests are transmitted during transmission request intervals, said user scheduling interval including multiple transmission request intervals and corresponding transmission request response intervals, wherein said transmission request intervals are interleaved with corresponding transmission request response intervals during said user scheduling interval, and wherein said transmission request intervals are ordered in said user scheduling interval according to transmission priority, transmission request intervals corresponding to connections having higher transmission priority occurring within said user scheduling interval before transmission request intervals corresponding to connections having lower priorities.

36. The computer readable medium of claim 35,
wherein said monitoring includes monitoring transmission request intervals including a transmission request interval during which a transmission request from the first device may be transmitted and any preceding transmission request intervals in said user scheduling interval.

37. An apparatus comprising:
a processor configured to control a second device, said second device having a first connection with a first device, said first and second device being peer to peer communications devices, said processor further configured to:
monitor during a user scheduling interval for transmission requests corresponding to a second connection having a higher priority than said first connection and for a transmission request from said first device, said second connection being between a third device and a fourth device;
store transmission request response information for transmission of data corresponding to one or more transmission requests between the third device and the fourth device corresponding to said second connection detected by said monitoring; and
if a transmission request from the first device is detected by said monitoring, determine whether to transmit a transmission request response based on a received signal quality value generated from the stored transmission request response information for transmission of data corresponding to the one or more transmission requests between the third device and the fourth device,
wherein transmission requests are transmitted during transmission request intervals, said user scheduling interval including multiple transmission request intervals and corresponding transmission request response intervals,
wherein said transmission request intervals are interleaved with corresponding transmission request response intervals during said user scheduling interval, and
wherein said transmission request intervals are ordered in said user scheduling interval according to transmission priority, transmission request intervals corresponding to connections having higher transmission priority occurring within said user scheduling interval before transmission request intervals corresponding to connections having lower priorities.

38. The apparatus of claim 37,
wherein said monitoring includes monitoring transmission request intervals including a transmission request interval during which a transmission request from the first device may be transmitted and any preceding transmission request intervals in said user scheduling interval.

39. A method of operating a second device having a first connection with a first device, said first and second devices being peer to peer communications devices, the method comprising:
monitoring, by the second device, during a user scheduling interval for transmission requests corresponding to a second connection having a higher priority than said first connection and for a transmission request from said first device, said second connection being between a third device and a fourth device;
storing, using a memory of the second device, signal information corresponding to transmission requests corresponding to said second connection detected by said monitoring; and
if a transmission request from the first device is detected by said monitoring, determining, by the second device, whether to transmit a transmission request response based on a received signal quality value generated from the stored signal information,
wherein transmission requests are transmitted during transmission request intervals, said user scheduling interval including multiple transmission request intervals and corresponding transmission request response intervals,
wherein said monitoring includes monitoring transmission request intervals including a transmission request interval during which a transmission request from the first device may be transmitted and any preceding transmission request intervals in said user scheduling interval,
wherein said transmission request intervals are ordered in said user scheduling interval according to transmission priority, transmission request intervals corresponding to connections having higher transmission priority occurring within said user scheduling interval before transmission request intervals corresponding to connections having lower priorities, and
wherein said transmission request intervals are interleaved with corresponding transmission request response intervals during said user scheduling interval.

40. A second device having a first connection with a first device, said first and second devices being peer to peer communications devices, the second device comprising:
a monitoring module for monitoring to detect during a user scheduling interval transmission requests corresponding to a second connection having a higher priority than said first connection and for a transmission request from said first device, said second connection being between a third device and a fourth device;
memory storing signal information corresponding to transmission requests corresponding to said second connection detected by said monitoring; and
a transmission request response determination module for determining whether to transmit a transmission request response based on a received signal quality value generated from the stored signal information in response to a transmission request from the first device detected by said monitoring module,
wherein transmission requests are transmitted during transmission request intervals, said user scheduling interval including multiple transmission request intervals and corresponding transmission request response intervals,
wherein said monitoring module includes a transmission request interval monitoring submodule for monitoring transmission request intervals including a transmission request interval during which a transmission request from the first device may be transmitted and any preceding transmission request intervals in said user scheduling interval,
wherein the second device further comprises memory storing timing structure information, said timing structure information identifying a set of ordered transmission request intervals corresponding to different priority levels, transmission request intervals corresponding to connections having higher transmission priority occurring within said user scheduling interval before transmission request intervals corresponding to connections having lower priorities, and
wherein said transmission request intervals are interleaved with corresponding transmission request response intervals during said user scheduling interval.

* * * * *